July 3, 1956  O. B. GRIFFES ET AL  2,753,035
EMBOSSING MACHINE
Filed March 17, 1952  10 Sheets-Sheet 1

Inventors
Orin B. Griffes
Milton W. Griffes
By Wallace and Cannon
Attorneys

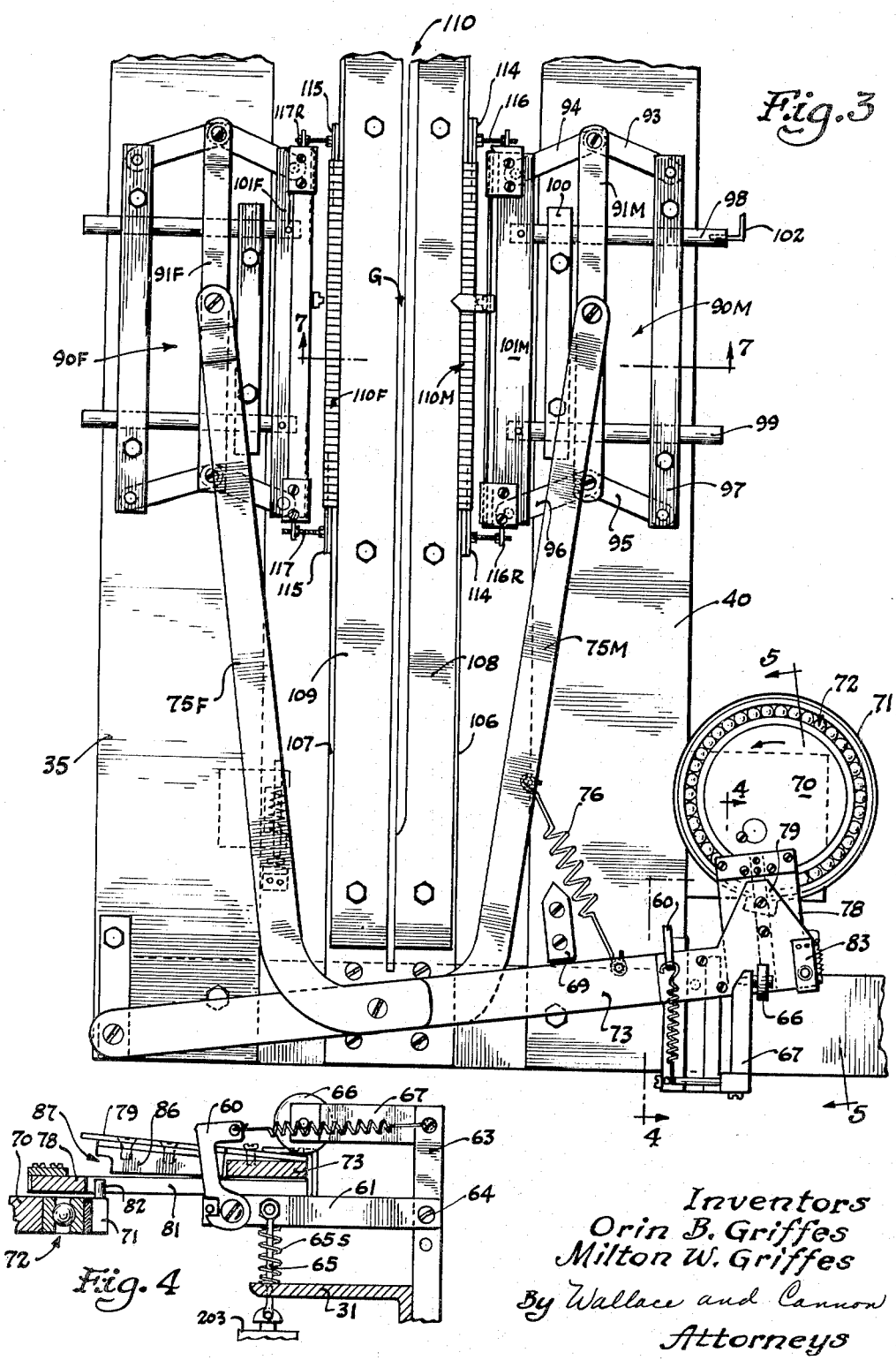

July 3, 1956
O. B. GRIFFES ET AL
2,753,035
EMBOSSING MACHINE
Filed March 17, 1952
10 Sheets-Sheet 3
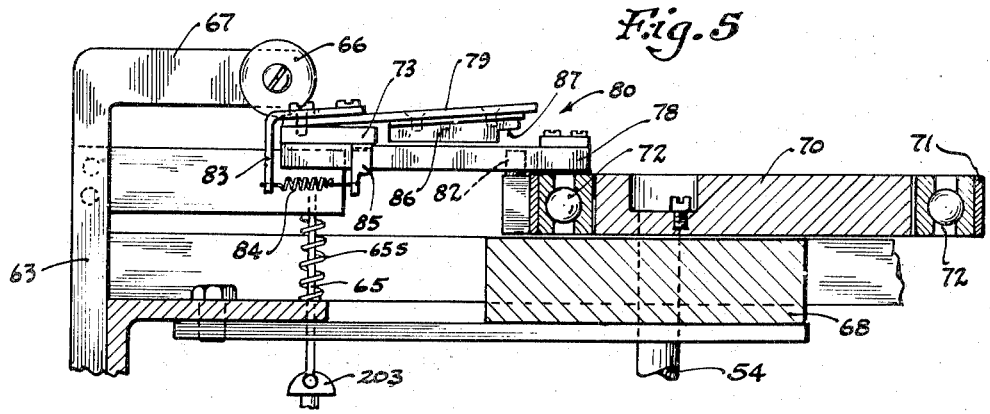
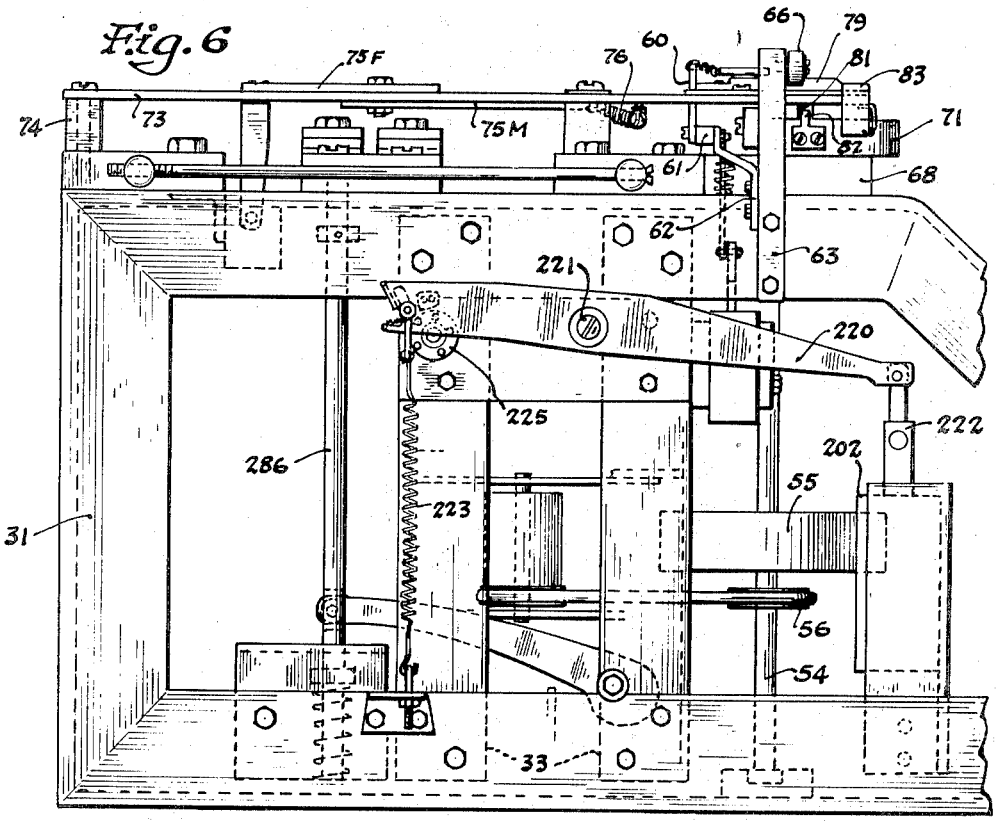
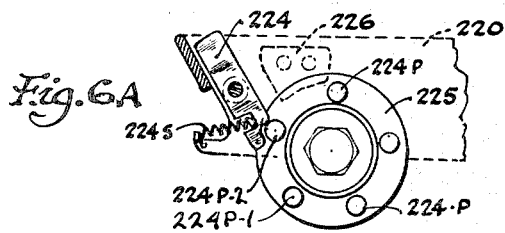
Inventors
Orin B. Griffes
Milton W. Griffes
By Wallace and Cannon
Attorneys

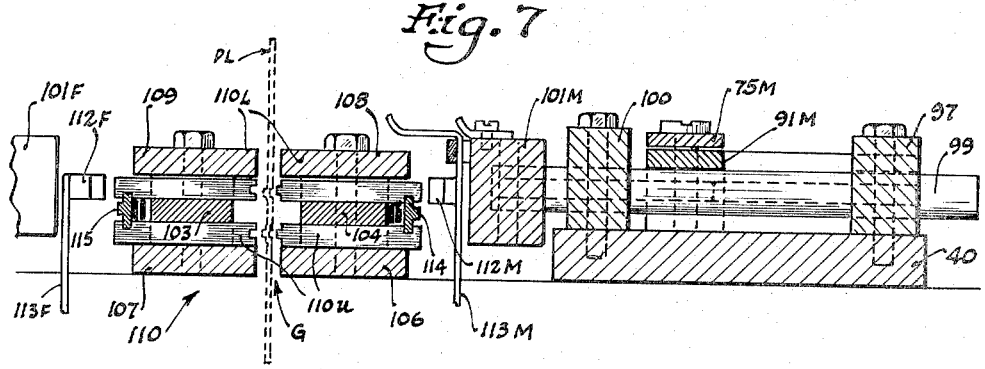
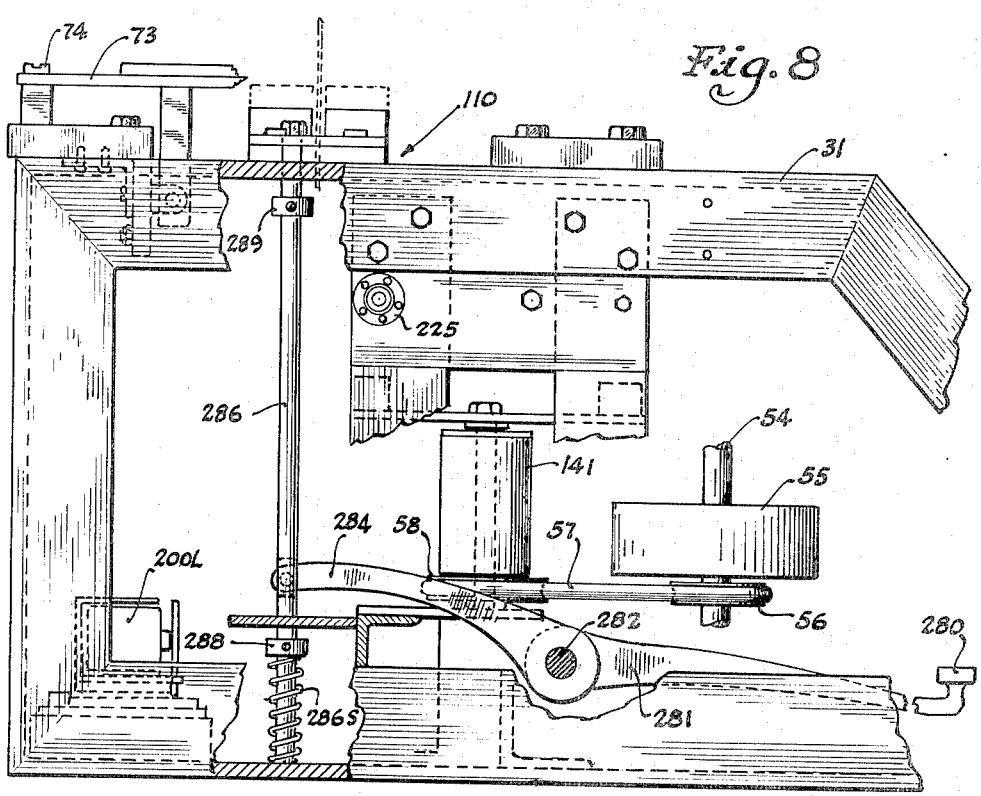

July 3, 1956
O. B. GRIFFES ET AL
2,753,035
EMBOSSING MACHINE
Filed March 17, 1952
10 Sheets-Sheet 5
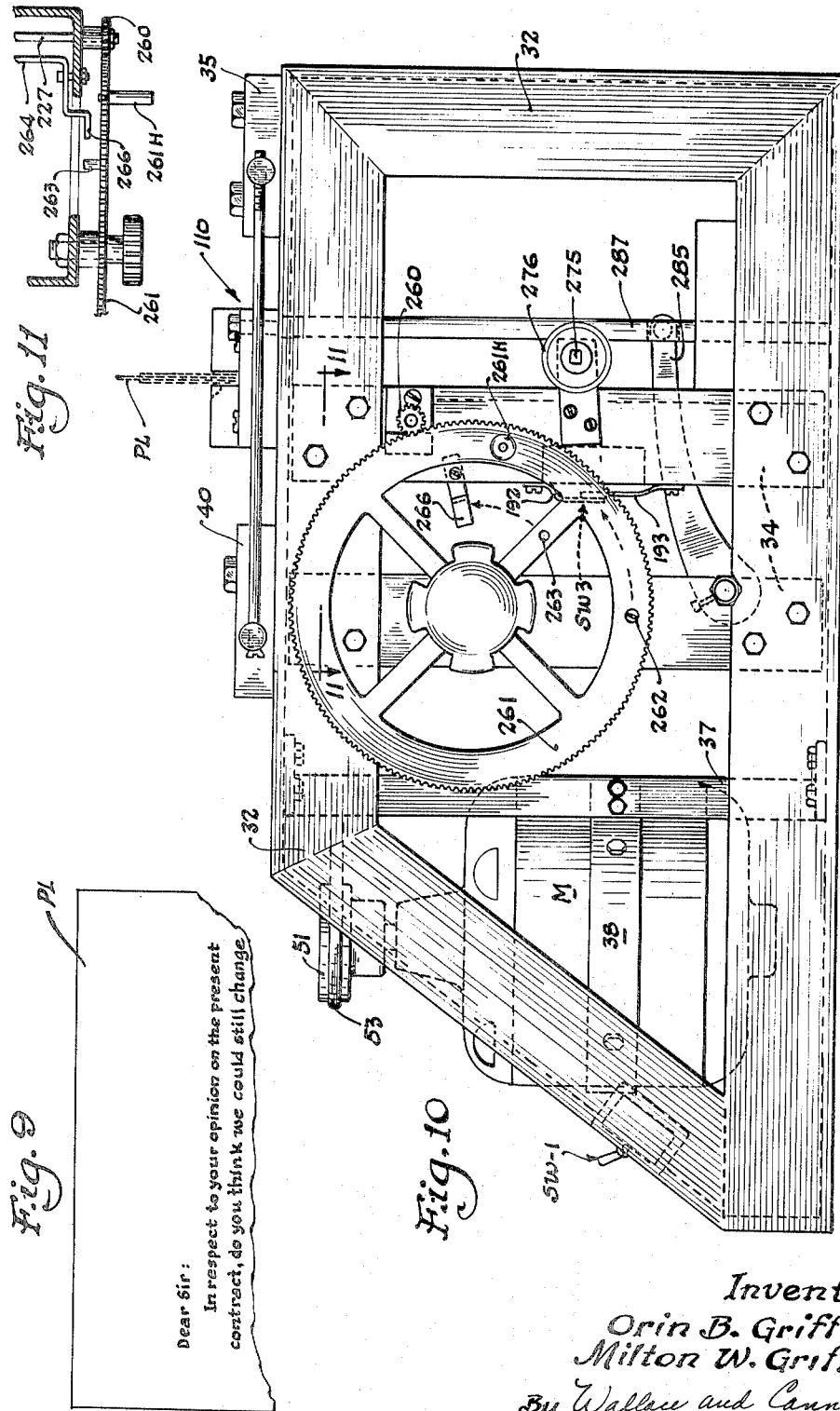
Inventors
Orin B. Griffes
Milton W. Griffes
By Wallace and Cannon
Attorneys

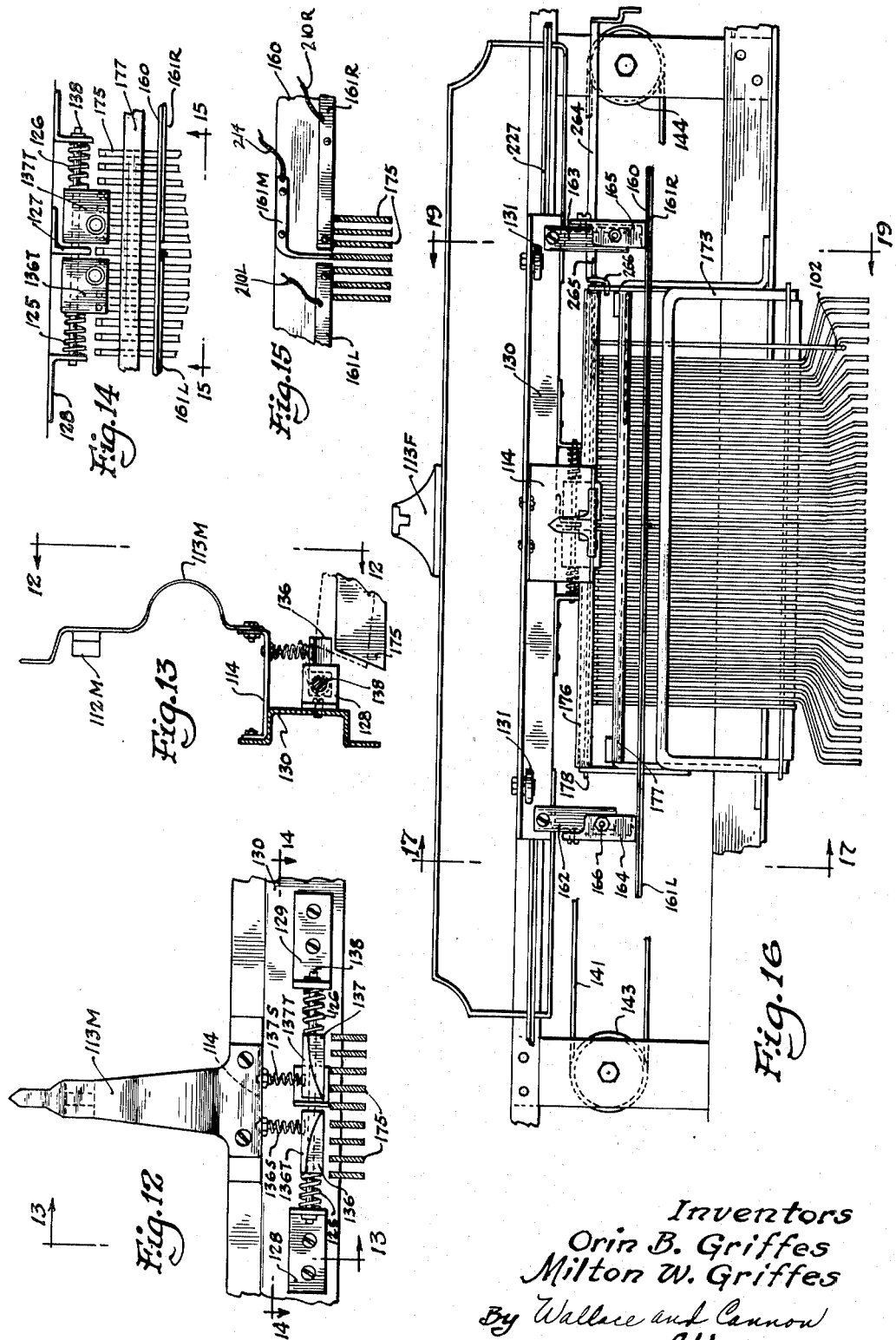

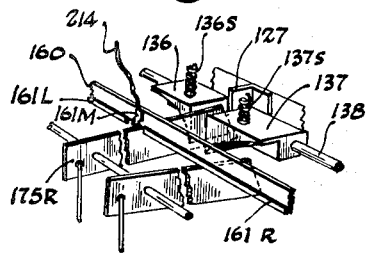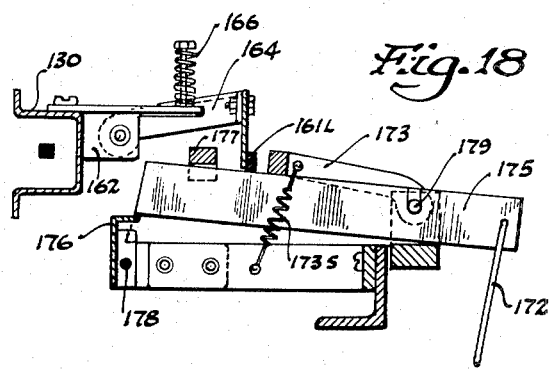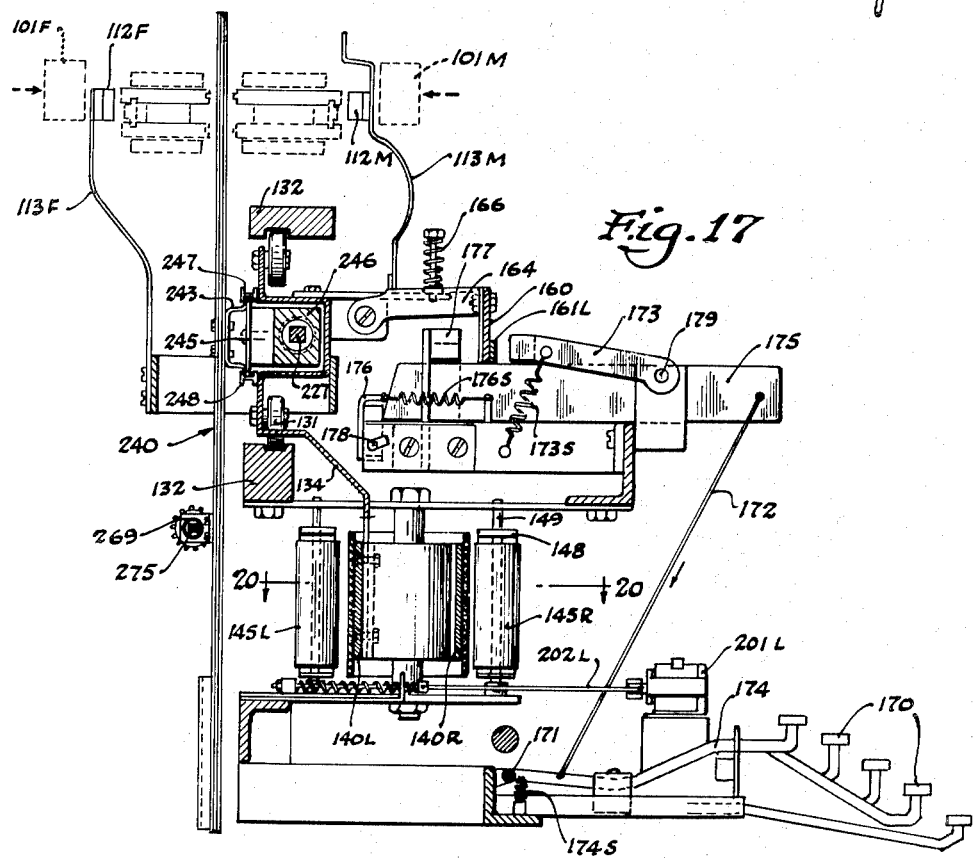

Inventors
Orin B. Griffes
Milton W. Griffes
By Wallace and Cannon
Attorneys

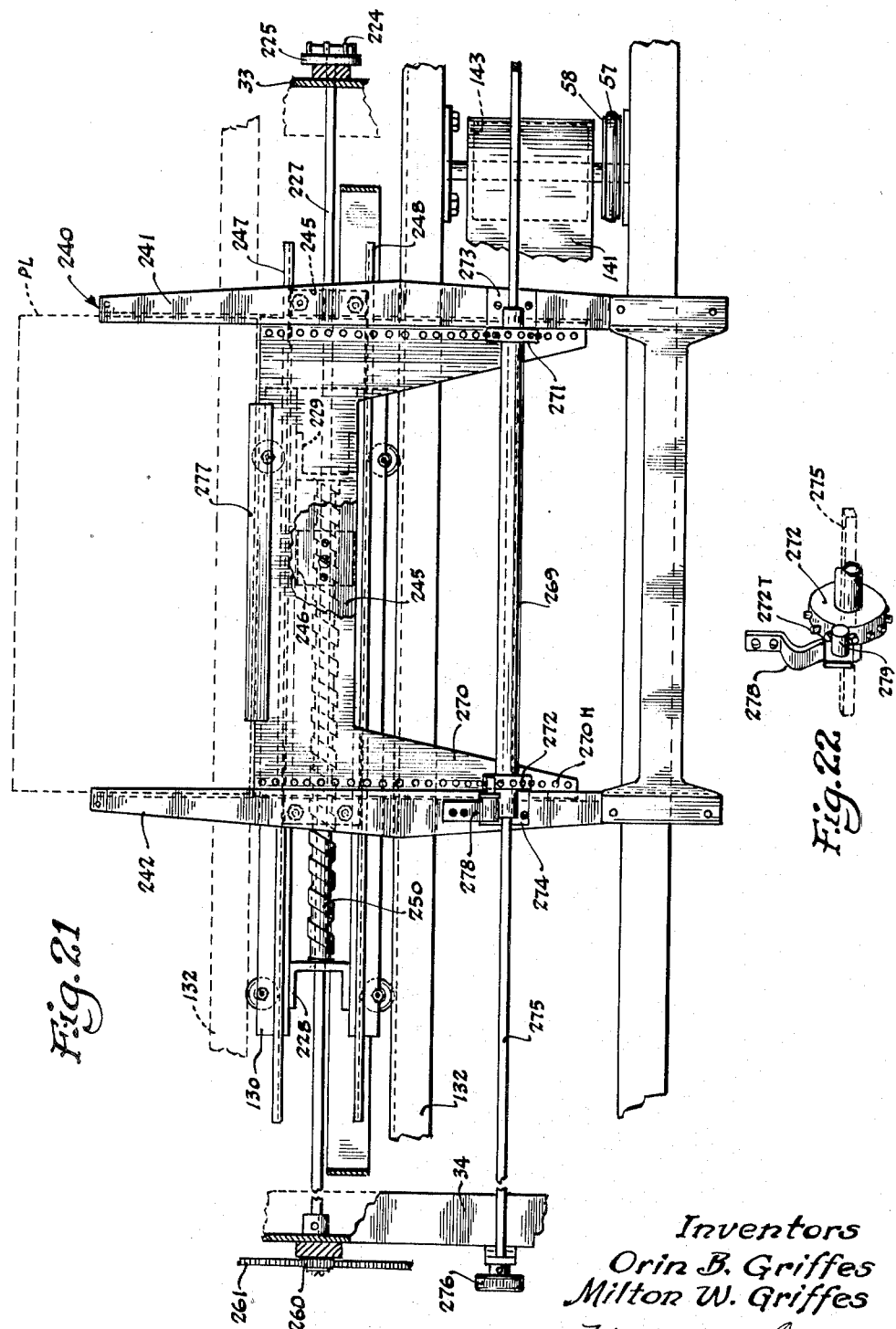

July 3, 1956

O. B. GRIFFES ET AL 2,753,035

EMBOSSING MACHINE

Filed March 17, 1952

Inventors
Orin B. Griffes
Milton W. Griffes
By Wallace and Cannon
Attorneys

United States Patent Office

2,753,035
Patented July 3, 1956

2,753,035

EMBOSSING MACHINE

Orin B. Griffes, Euclid, and Milton W. Griffes, North Madison, Ohio, assignors to Addressograph-Multigraph Corporation, Wilmington, Del., a corporation of Delaware Application March 17, 1952, Serial No. 276,904

34 Claims. (Cl. 197—6)

This invention relates to embossing machines and more particularly to that type in which different punch and die sets may be selectively operated to thereby reproduce or emboss different characters, the machine being adapted for character spacing between successive character embossing operations. The embossing machine of the present invention has particularly utility in connection with plates that may be embossed with addresses and the like, in which case the machine is also adapted for line spacing, but it will be appreciated that such constitutes but one type of operation to which the present invention may be applied.

Embossing machines of the character adapted to emboss plate-like articles and the like with a line or lines of data employ relative movements between the punch and die support and the article to be embossed, and the punches and dies must not only be capable of quick, direct, and accurate movements toward and away from the article but must also be susceptible to impressing relatively high embossing pressures to effect sharp and well-defined embossures. As a consequence, it is essential to provide an extremely sturdy, precise machine that is capable of absorbing embossing impacts without thereby experiencing deleterious effects, and in a machine of practical size the aforesaid embossing pressure or force must be established in a relative short distance of travel.

From the above it will be seen that inertia and force represent substantial factors that influence impedance of movement, resistance to stresses, and absorbance of shock, and also make necessary the use of a means for quickly and accurately stopping certain members that may possess a substantial degree of momentum once having been accelerated from an at-rest position. In prior embossing machines, the result has been a type of operation that is slower than that which is desirable in many instances, this being engendered in a large part either by a punch and die support that is moved relative to the article being embossed or by the absence of a means that permits relative movements, during embossing operations, over the shortest paths, and it is therefore the primary object of this invention to afford a means for effecting relative movements over the shortest possible path, that is, from the character last embossed to the character next to be embossed and this irrespective of whether the character next to be embossed is to the right or left of the character last embossed. A related object of the present invention is to reduce the number of parts required to effect successive embossures, thereby eliminating movements associated therewith and increasing the speed of operation of the machine.

The punch and die support in an embossing machine is relatively heavy when compared to the operable parts of the machine and when moved during embossing operations represents a member that may possess or attain considerable momentum. Accordingly, it is an object of the present invention to maintain the punch and die support stationary in the machine while effecting relative movement during embossing operations by moving the article to be embossed relative to the punch and die support, and this relative movement to occur over the shortest possible path between the successive punch and die sets. In this connection, a related object is to so mount the article holder or carrier in the machine that the same may assume various and different at-rest positions in relation to the punch and die support during the period required for the embossing operation, and yet may be moved either in one direction or another from the at-rest position corresponding to the punch and die set last actuated directly to the punch and die set next to be actuated.

Heretofore in the art it has been proposed to effect, between the punch and die support on the one hand and the article being embossed on the other, a relative movement during an embossing operation that is initiated from a zero position to the position corresponding to the selected embossing operation and then back, following embossing, to the zero position, which latter remains constant for all selected operations, and it is therefore a further object of the present invention to so arrange parts in the machine that after any particular embossure is effected the position next to be assumed by the article holder or carriage during the next selected embossing operation may be indexed to the previous or last embossing position of the carriage or holder so that such article holder may be moved directly between such two positions, another means being afforded to so limit the corresponding relative movement of the holder.

Additional objects of the present invention are to actuate the punches and dies by means of a novel toggle and clutch mechanism, and to afford in an embossing machine a novel means that is adapted to drive a movable carriage member in either of two opposite directions.

Other and further objects of the present invention will be apparent from the following description and claims and are illustrated in the accompanying drawings which, by way of illustration, show a preferred embodiment of the present invention and the principle thereof and what we now consider to be the best mode in which we have contemplated applying that principle. Other embodiments of the invention embodying the same or equivalent principles may be used and structural changes may be made as desired by those skilled in the art without departing from the present invention and the purview of the appended claims.

In the drawings:

Fig. 3 is a fragmentary plan view, drawn to an enlarged scale, of the embossing means of this invention;

Figure 1:
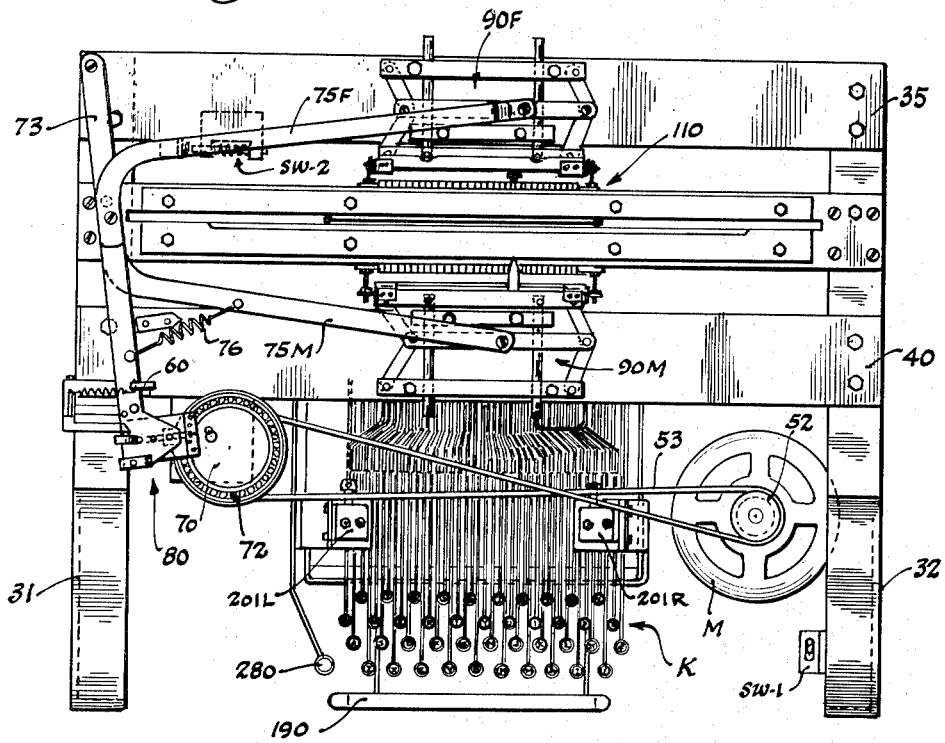
Fig. 1 is a plan view of an embossing machine embodying the present invention.
Figure 2:
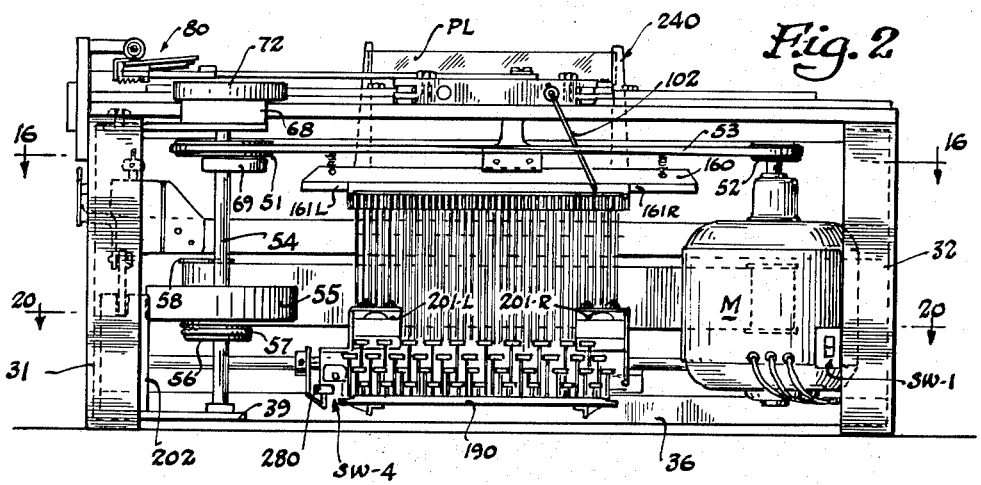
Fig. 2 is a front elevation of the machine shown in Fig. 1.

Figs. 4 and 5 are sectional views on a further enlarged scale taken substantially and respectively on the lines 4—4 and 5—5 on Fig. 3;

Fig. 6 is a side elevation, drawn to an enlarged scale, of the left hand end of the machine as shown in Figs. 1 and 2;

Fig. 6A is a detail view, on a further enlarged scale, of a part of the character spacing means shown in Fig. 6;

Fig. 7 is a fragmentary sectional view, on an enlarged scale, taken substantially on the line 7—7 on Fig. 3, certain parts being broken away;

Fig. 8 is an end elevational view similar to Fig. 6 and in which certain parts are broken away so as to expose other parts;

Fig. 9 is a plan view of the type of article adapted to be handled by the present machine;

Fig. 10 is an end elevational view of the right hand end of the machine as shown in Figs. 1 and 2;

Fig. 11 is a sectional view taken substantially on the line 11—11 on Fig. 10;

Fig. 12 is a front elevational detail view taken on the line 12—12 on Fig. 17;

Fig. 13 is a sectional view taken along the line 13—13 on Fig. 12;

Fig. 14 is a plan detail view taken on the line 14—14 on Fig. 17;

Fig. 15 is a front elevation detail view taken substantially on the line 15—15 on Fig. 14;

Fig. 16 is a plan view drawn to an enlarged scale, and taken on the line 16—16 on Fig. 2;

Fig. 17 is a sectional view, on an enlarged scale, taken substantially on the line 17—17 on Fig. 16;

Fig. 18 is a fragmentary view of a portion of the machine shown in Fig. 17 and showing a key bar in elevated position;

Fig. 18A is a detail perspective view of a particular phase of operation in the present machine.

Figure 19:
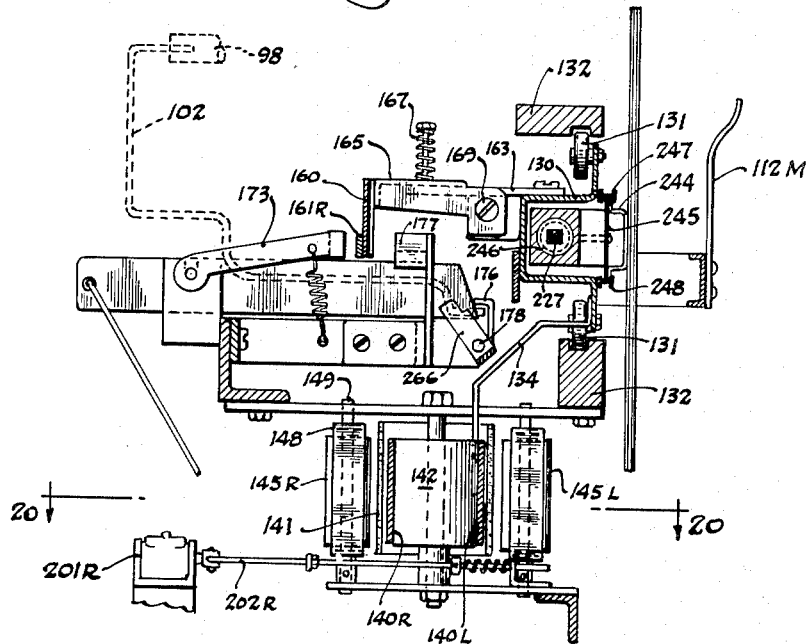
Figure 20:
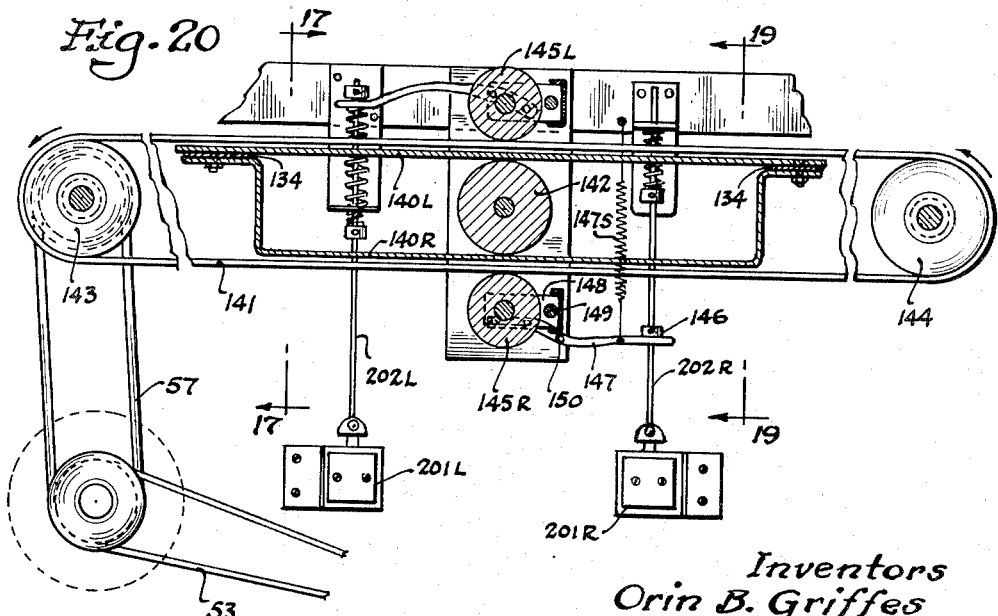
Figure 23:
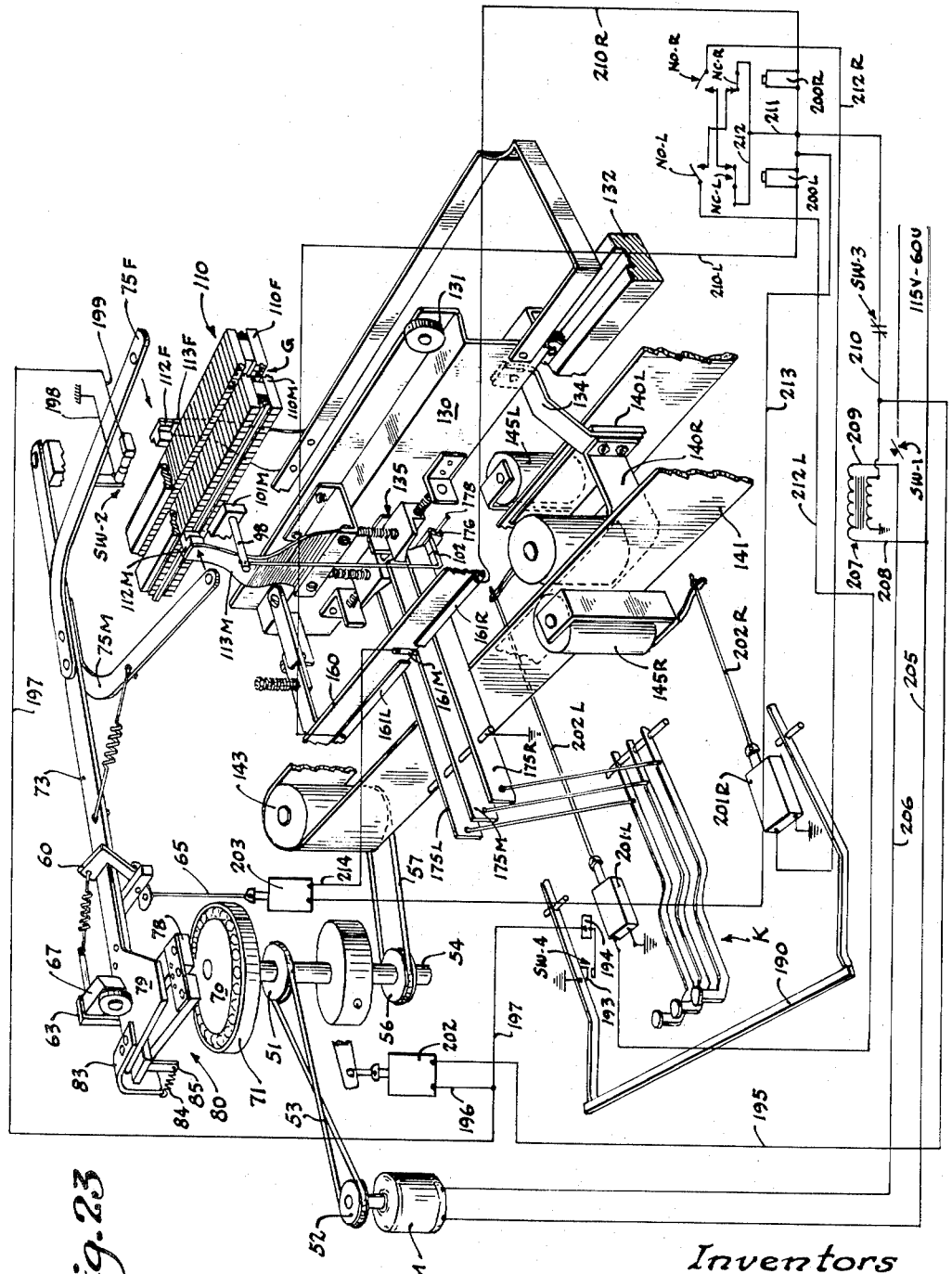

Fig. 19 is a sectional view, drawn to an enlarged scale, and taken substantially on the line 19—19 on Fig. 16;

Fig. 20 is a fragmentary sectional view taken on the line 20—20 of Fig. 2;

Fig. 21 is an elevational view looking into the back of the machine;

Fig. 22 is a perspective view of a part of the line spacing means shown in Fig. 21; and Fig. 23 is a somewhat schematic perspective view illustrating the relation of the elements of the machine.

Before considering the present invention in detail, brief references may be had to Figs. 21 and 23 in regard to the general arrangement of the principal mechanisms and subcombinations of our machine in which a punch and die support generally indicated at 110 is afforded in a central position adjacent the top of the machine. The punches 110M and dies 110F are arranged in a row, the punches facing away from the operator, and selected related ones are adapted to be shifted toward one another so as to attain embossing pressure or momentum by means of a pair of opposed strikers 112M and 112F. The strikers are both carried on a main carriage 130 which is provided with rollers as 131 that are adapted to travel either to the right or left in a pair of opposed rails 132, the latter, like the punch and die support, being stationary relative to the support on which the machine is placed.

Cooperating punches and dies, selected in pairs according to a characterized key on a key board K, are adapted to move together, under the impulse of the strikers, toward the elongated groove G which separates them, and it is this groove that defines the vertical plane of the article to be embossed. Thus, during operation, the embossing machine may produce horizontally and vertically spaced-apart embossures of the type indicated in Fig. 9 on a plate having the configuration of the plate PL. However, such plate represents but one form that may be used in connection with the present machine, and it will be clear as the description proceeds wherein changes may be made accordingly as it may be desired to accommodate plates of different configuration. The plate, or article to be embossed as PL, may assume, during embossing operations, any one of three movements while located in the groove G. Thus, as was noted above, the main carriage 130 is adapted to be shifted to the right or left in the tracks 132 thereby moving the strikers from the pair of related dies last actuated to the pair of related dies next to be actuated. This action of the main carriage may be termed "character selection."

The strikers 112M and 112F, being shiftable with the main carriage 130, are of course stationary in relation thereto, that is to say, occupy a fixed, or identify an index position, in relation to the main carriage. Moreover, as shown in Fig. 21, the plate as PL is carried in a plate carriage 240 which is located behind the main carriage 130. The carriage 240 in turn is carried with the main carriage 130 during the time that the latter relocates the strikers 112M and 112F, and from this it follows that unless a means be afforded to move the plate carriage 130 stepwise to the left following an embossure of the plate PL, the latter will be embossed continuously at the same spot irrespective of the extent or direction of movement of the main carriage 130 during character selection. Such means assumes the form of a worm drive 250 that rotates a circular distance corresponding to the linear distance between characters as indicated for the plate PL in Fig. 9, this movement of the worm drive 250 occurring between successive embossures at a time when the die strikers are removed from the punches and dies. This relatively short spacing movement of the plate carriage 240 may be termed "character spacing." In order to afford the usual spacing between words, a spacer bar 190 is provided, and the manner in which this bar is adapted to direct a drive to the worm 250 will be considered later.

Finally, and as shown in Fig. 21, there is provided a rack 270 coplanar with the plate carriage, the rack being formed on either side with spaced apart holes which define the distance between lines as on the plate PL shown in Fig. 9. The rack may be moved up and down, in ways provided in the plate frame to accordingly move the plate as PL, by means including a pair of pinions 271 and 272. This action of the rack and pinions may be termed "line spacing."

From the above, it will be seen that insofar as a plate PL positionable in the machine is concerned, there are three principal movements relative to the support on which the machine sets, namely, character selection, character spacing, and line spacing. The latter is a manual operation while the other two are normally automatic. However, as will be pointed out, manual means in the form of a spacer bar 190 are afforded for character spacing, and by means of a simple manipulation to be described in detail below, the character spacing mechanism may be used for back spacing and also to shift the plate carriage 240 from one marginal limit to the other in a single movement.

The general manner of operation is as follows: Depending from the front of the main carriage 130 is an elongated frame 140 consisting of a front plate 140R and a back plate 140L. Positioned closely adjacent the outside faces of the plates 140R and 140L is an endless friction belt 141 that is adapted to be driven by a roller 143, the latter in turn being driven from a main drive shaft 54 by means including a belt 57 and a pulley 58 secured to the bottom of roller 143. As indicated in Fig. 23, the belt 141 has a run to the right (front) and a run to the left (rear) so that if a means were afforded to press one or the other run against the associated plate of the frame 140 the latter would be carried to the right or left as the case may be depending upon whether the right run engages plate 140R or the left run engages plate 140L. Such means include a pair of rollers 145R and 145L, one for the right run and one for the left run of the belt 141. These latter rollers are each adapted to be pivoted toward and away from the belt 141 so that the particular run of this belt is pressed firmly against the associated plate 140R or 140L of the frame 140. The manner in which the particular roller is selected will be described below, but for present purposes it can be pointed out that the frame 140, and therefore the main carriage 130, strikers 112M and 112F, and the plate carriage 240, are carried, during a character selection operation, either to the right or left of an at-rest position depending upon whether the punch and die set next to be actuated is to the right or left, respectively, of the set last actuated.

The strikers 112M and 112F are carried on springs 113M and 113F so that they normally locate themselves away from the punches and dies. A pair of arms 75M and 75F constitute part of the means that enable the strikers to attain sufficient force in their movement toward one another, sufficient to produce embossures of the type indicated in Fig. 9. Actuation of the arms 75M and 75F is under control of a clutch generally indicated at 80 that is operated from the main drive shaft 54. The drive shaft 54 in turn is driven from a motor M, and it will be seen therefore that this shaft is adapted to direct enabling forces not only to the die head 110, but also to the main carriage 130.

Referring more specifically to Figs. 1, 2 and 10, the main support or frame for the machine comprises a pair of symmetrically configured and spaced-apart side members 31 and 32 that, together with vertical tie bars 33, 34 and horizontal tie bars 35 and 40 suspend most of the working parts. At the rear of the machine is a platform 36, Fig. 2, upon which a pair of relays and a transformer may set, the purpose of the latter being pointed out hereinbelow. Extending vertically of the right frame member 32 is an auxiliary support 37 to which is connected a strap 38 for holding the motor M in position. The delivery end of the motor M is in the form of a pulley 52 that is aligned horizontally with a pulley 51 at the opposite side of the machine, and a cross belt 53 interconnects these two pulleys so that the drive shaft 54, to which pulley 51 is fixed, is driven in the direction of the arrow Fig. 23. The drive shaft 54 is journaled in a platform 39 which is supported approximately centrally of the frame member 31 at the bottom thereof, and carries a fly wheel 55 beneath which another pulley 56 is fixed to the drive shaft. The latter pulley drives the belt 57 counterclockwise when viewed from the front of the machine as in Fig. 2, and in turn the roller 143, Fig. 23, is so driven that the belt 141 passes from left to right relative to the plate 140R and then back along the rear face of plate 140L. It will thus be seen that so long as the motor M is effective to drive the belt 53 to drive the main drive shaft 54, the drive roller 143 is driven constantly by belt 57, and belt 141 in turn will make continuous passes about the frame 140.

In contrast to the direct drive to the belt 141 which can be so coupled to the frame 140 to shift the main carriage 130 to the left or right during a character selection operation, actuation of the selected set of punches and dies in the punch and die support 110 is an indirect operation controlled through a clutch 80, Figs. 1–6A, that is adapted to impart oscillating motion to an arm 73. In turn, arm 73 controls a pair of opposed toggle mechanisms 90M and 90F which send drive bars 101M and 101F against the rear faces of the strikers 112M and 112F. The means for translating the rotary motion of the drive shaft 54 for operating the arm 73 includes an eccentric disc 70 carried at the upper end of the drive shaft, this eccentric being balanced by a counterweight 69, Fig. 2, and there being a supporting member 68 between the eccentric and the counter-weight. A circular strap 71 surrounds the eccentric disc 70 and is rotatively isolated therefrom by means of roller bearings generally indicated at 72.

As best shown in Fig. 6, the arm 73 is pivoted at 74 to the left rear corner of the machine so that it is spaced above and extends in a forward direction in parallel relation to the top of the left frame member 31. At an intermediate point along its length, two other arms 75F and 75M are pivotally connected to the arm 73, the manner in which these two arms are operated to be considered presently in connection with the control of the toggle mechanism 90M and 90F. A spring 76 tends to draw arm 73 counterclockwise, as viewed in Fig. 1, about the pivot 74. Two plates 78 and 79 are mounted on the forward end of the arm 73, and the latter is spaced above the top of frame member 31 a distance sufficient to permit the lower of the two plates, 78, to overlie the strap 71 as shown in Fig. 4. Plate 78 is fixed to the end of arm 73 in a true horizontal plane and is provided with a slot or way 81 which acts as a guide for a pin 82 fixed to a point on the upper side of the strap 71.

Thus, the pin 82, so long as the eccentric 70 is being turned by the shaft 54, will describe reciprocating strokes back and forth in the way 81, assuming of course that the latter is unobstructed, and such movement of the pin is adapted to drive the arm 73 as follows: The upper of the two plates 78 and 79, namely plate 79, is loosely mounted on arm 73 to the extent that it is free to pivot about the outer edge thereof, within small limts as will be clear from Fig. 5. The horizontal leg of a small angled lever 83 is fixed to the upper surface of plate 79, and a spring 84 interconnecting a lug 85 at the underside of the arm 73 to the vertical leg of the lever 83, causes the latter to hold plate 79 in its normal or retracted position shown in Fig. 5. Pivotal movement downward, as viewed in Fig. 5, of the plate 79 is under control of the clutch 80 as will be pointed out presently.

Fixed to the underside of the plate 79 is a small bar 86 of a width slightly less than the width of way 81 and which is formed with a shoulder element 87, Fig. 5, of a size and configuration corresponding substantially to the projection of the pin 82. That is to say, upon engagement of clutch 80, plate 79 is pivoted counterclockwise as viewed in Fig. 4 about the outer longitudinal edge of the arm 73, and against the action of spring 84, whereupon bar 86 drops into slot 81 and the shoulder element 87 is thereby placed in position to intercept pin 82 during its movement to the left in way 81 as viewed in Fig. 5. It may herein be pointed out, as will be appreciated later, that the fact that the in 82 may be at an intermediate point in its movement to the left, as viewed in Fig. 5, when the engagement of clutch 80 causes plate 79 and bar 86 to be urged downwardly is immaterial, and under such conditions the pin 82 will simply continue its movement until the position shown in Figs. 4 and 5 is reached whereupon plate 79 is then free to be carried downward to place bar 86 in the way 81.

As a means for engaging and permitting disengagement of the clutch 80, manifest in the downward and upward pivotal movements respectively of the plate 79, there is provided a hook 60, Fig. 4, which is supported at one end of a lever 61 and which overlies a portion of that part of plate 79 which extends backward along the upper surface of arm 73. It will at once be clear that any downward movement of the lever 61 will cause hook 60 to engage the aforesaid portion of plate 79 and continued downward movement of the lever 61 will be manifest in bar 86 intercepting the path of pin 82, whereupon, the clutch being engaged, arm 73 is actuated. Such movement of lever 61 is accomplished as follows: Lever 61 is pivotally connected at 64 to a bracket 62, the latter being secured in place to an upstanding support 63 which in turn is made fast to the frame member 31 as shown in Fig. 6. At a point removed from the pivot 64, a plunger 65 is connected to the lever 61, and a spring 65S tends to normally place lever 61 in a horizontal position whereat the hook 60 is maintained disengaged relative to the aforesaid portion of plate 79. Accordingly, any effective downward movement of the plunger 65 will be accompanied by hook 60 engaging plate 79 whereupon pin 82 may engage shoulder 87 causing arm 73 to move clockwise from its normal position indicated in Fig. 3. A roller 66 is carried in a fixed position at the end of an arm 67 that is fixed to the upper end of the support 63, and by such means the clutch is held engaged as pin 82 continues to force plate 79 therebeneath causing the roller to react against the force of spring 84 as will be clear from Figs. 3, 4 and 5. The details and precise manner concerning the actuation of plunger 65 will be considered below and while such is accomplished by means of a solenoid in the present embodiment it will be obvious that such may be subject to other controls such as a cam control.

The only forces holding arm 73 against clockwise movement as viewed in Fig. 1 are the spring 76 and what sliding friction may be present in the parts directly controlled by arm 73, so that when pin 82 drivingly engages the shoulder 87, arm 73 is carried to the left, as viewed in Figs. 1 and 2, about the pivot 74. As best shown in Fig. 3, the arms 75M and 75F which are each connected at one end to a common point on the arm 73, are connected at their other ends to cross links 91M and 91F respectively of the respective toggle mechanisms 90M and 90F. Pivotally connected to the cross links 91M and 91F so as to constitute knees at either end of the latter are links as 93, 94, 95 and 96, and since the operation of both toggle mechanisms 90M and 90F, as well as the mechanical embodiment therein, is similar in every respect, only the toggle mechanism 90M for the punches 110M and striker 112M will be considered in detail. The links 93 and 95 are each pivotally connected at one end to the respective ends of a relatively small guide bar 97 that is fixed in position on the horizontal tie bar 40. The guide bar 97 is drilled at two points for the reception of two guide rods 98 and 99 that also extend through similar openings in another guide bar 100. The links 94 and 96 are each pivotally connected at one end to the respective ends of a universal drive bar 101M that is spaced from the row of punches 110M in parallel relation thereto, and the inner ends of the guide rods 98 and 99 are connected to this drive bar. The universal bar 101M is normally located immediately behind the striker 112M for the punches.

The toggle arrangement for the dies 110F is similar, the universal bar 101M having its counterpart in universal drive bar 101F, and from the above it will be clear that when the arm 73 is positively driven upon engagement of the clutch 80, the arms 75M and 75F will be pulled from right to left on the machine, as will be the cross links 91M and 91F, whereupon strikers 112M and 112F will receive impacts from the respective universal bars 110M and 101F, the guide bars as 98 and 99 assuring that embossing impacts thus imparted to the particular punch and die are evenly distributed. As will be discussed in detail below, the die strikers are located relative to the support 110 during character selection in accordance with the character selected at the keyboard K.

It will be appreciated that effective embossing impacts of the particular pair of cooperating punches and dies against the plate as PL positioned in the groove G, Fig. 23, are defined substantially by the eccentric 70 being rotated substantially 180° counter-clockwise from the position indicated in Figs. 1 and 3. That is to say, the time that arm 73 reaches its extreme limit of clockwise oscillation as viewed in these figures conforms substantially to the time that the punches and dies effect an embossure. Under such conditions, clutch 80 is still maintained engaged by the roller 66, and consequently pin 82 tends to resist the returning action of spring 76 on the arm 73 during return movement of the eccentric 70 so that arm 73 in effect is eased back into its normal position, plate 79 pivoting upwardly to the position in Fig. 4 when the torque exerted thereon by roller 66 is exceeded by the force of spring 84. When in its normal position, arm 73 is located by a stationary lug 69, Fig. 3, secured to the horizontal tie member 40.

As will be described in detail below, the plate as PL is stepped to the left a distance corresponding to the spacing between characters during the time that arm 73 is shifting from left to right, as viewed in Fig. 1, while describing its oscillating movement that accompanies an embossing operation.

In the form of the invention illustrated in Figs. 1, 2 and 3, the novel concepts have been reduced to a form of practice that depends primarily upon a means for shifting the main carriage 130 from one pair of selected dies to another irrespective of whether the shifting thus required be to the right or left in relation to the support 110, a means for causing an embossing operation to occur at the moment the main carriage has located the article to be embossed in proper embossing position, and a means to effect a character spacing operation between successive embossing operations. Such means operate in timed sequence, and in the present instance such is afforded by a series of solenoids one associated with each of the above means for controlling character selection, character spacing, and embossing operations, but it will be appreciated in this regard that mechanical means equivalent thereto may be utilized as desired or as found to be expedient for the purposes and demands at hand. In general, it may be stated when a selected one of the keys 170 of the keyboard K is depressed, one or another solenoid 201R or 201L is energized and the main carriage 130 shifts to the right or left in relation to the support 110, depending upon whether the aforesaid solenoid causes roller 145R or roller 145L to pick up the left or right run respectively of the belt 141. Depression of a key as 170 is accompanied by the raising of one end of a corresponding key bar as 175, and the main carriage 130, now being driven by means of belt 141 and the frame 140, travels along the rails 132 until the thus-raised key bar is detected by a means carried by the main carriage 130 whereupon the latter is stopped and the article being embossed is located in proper position opposite the selected punch and die set corresponding to the aforesaid selected key. Simultaneously, upon stoppage of the carriage 130 as defined by a sensing of a raised bar as 175, plunger 65 is drawn downwardly as the result of energization of another solenoid 203 thereby causing clutch 80 to engage and couple arm 73 to the main drive means 54, thus instituting an embossing operation. Following an embossing operation, the plate carriage 240 undergoes a character spacing operation, such being caused by a rotation of the worm drive 250, actuation of the latter being under control of a third solenoid 202 which is energized momentarily during the return movement of the arms 75M and 75F, that is, following upon an embossing operation. This completes a normal cycle of operation, defined broadly by three distinct types of movements following one upon another, and it may be mentioned that the bar as 175, raised as aforesaid, is returned to normal position along with the corresponding depressed key substantially simultaneously with the creation of an embossure. For purposes of disclosure therefor, the detailed description to follow will be directed to a separate consideration of "character selection," "embossing operation," and "character spacing" in order.

*Character selection*

In general, it may be stated that character selection in the present embodiment is attended by the use, first of all, of a conventional typewriter keyboard K in which characters are depicted on the usual keys 170 arranged for the shortest possible movements of the operator's fingers. Thus, as will be appreciated from the description to follow, the article to be embossed in accordance with the practice of the present invention is shifted over the shortest possible path from one punch and die set to the next, that is to say, those characters used most often are grouped together not only on the keyboard K, but this arrangement is present also in the key bars 175 and the support 110. As the description proceeds, it will be seen that in this phase of operation the particular manner or arrangement by which the main carriage 130 is positioned in relation to the die head 110 is not so important as is the fact that a means be afforded whereby the carriage 130, during successive character selections, is shifted from a position corresponding to the character last embossed directly to a new position corresponding to the character next to be embossed. In the present instance, the means for thus controlling shifting movement of the carriage 130 in one direction or another includes an insulating bar 160, Fig. 23, that carries a left electrical contact segment 161L and a right electrical contact segment 161R, and for the moment it may be pointed out that the main carriage 130 is shifted to the left or right accordingly as the depression of a key as 170 causes a bar as 175 corresponding thereto to engage either the left contact 161L or the right contact 161R, a third or middle contact 161M acting as an index for this operation in the sense that it is associated or positioned directly above the key bar as 175M which was last actuated to a raised position during the previous character selection operation performed by the operator. It may also be herein pointed out that as shown in Fig. 23, the distance between the facing ends of the contacts 161L and 161R is such that neither overlies any part of the key bar 175M last actuated; on the other hand, the length of each contact must be such that it will overlie all the key bars either to the left or right of the key bar last actuated irrespective of where that bar may be in relation to the row of key bars.

Referring more specifically to Figs. 12–19, a series of key bars 175 are arranged in a horizontal row directly beneath the insulator bar 160 in position to engage one or the other contact 161L or 161R as the result of an upward shifting movement, the key bars being maintained in spaced relation and guided in their upward movement by a comb 177 that is fixed in position. Such upward shifting movement of the bars 175 is afforded by providing a horizontally extending rod 179 about which all the bars as 175 are free to pivot, and wires as 172 interconnecting the outer ends of each of the key bars with inner extensions of the corresponding shanks 174 of the keys as 170. Each of the key shanks in turn is free to pivot about a rod 171 that is common to all shanks, and thus it will be seen that when a selected key is depressed a corresponding key bar is raised below the insulation bar 160 and into contact with one or the other contact 161L or 161R. As shown in Fig. 17, each key as 170 is normally spring-urged to an upright or non-depressed position, and a spring-urged bail 173 tends to locate and hold all the key bars in true horizontal alignment.

As will be appreciated from the description to follow, it is essential that once a key bar as 175 is elevated it be maintained in engagement with the particular contact on the bar 160, at least until such elevated key bar is sensed by a means carried on the main carriage 130, and this condition is assured by providing a universal lock bar 176 that is normally held against the inner ends of each of the key bars by means of a spring 176S as shown in Fig. 17. The lock bar 176 is free to pivot on a rod 178, Fig. 18, and consequently when a key bar is raised from the position in Fig. 17 to that in Fig. 18, this is done against the action of spring 176S, in part, and the lock bar 176 is cammed backwards about the pivot 178 by the bevelled end of the actuated key bar. However, upon reaching a fully raised position as defined in part by the comb 176, the end of the actuated key bar has been raised out of the path of the lock bar 176 and the latter is drawn inward by the spring 176S so that the key bar is thereby locked in its elevated position as shown in Fig. 10. Such a locked-up condition of the actuated key bar is maintained until an embossure is effected as will be described below.

In order that assurance may be had of certain engagement between the elevated key bar and the particular contact 161L or 161R, the bar 160 is pivotally mounted in relation to the main carriage 130. Thus, a pair of flanges 162 and 163 extend forward of the main carriage 130 at opposite ends, and plates 164 and 165 are pivoted as at 169, Fig. 19, to the flanges. In turn, the pivoted plates carry the insulator bar 160 and a pair of springs 166 and 167 normally tend to hold the plates 164 and 165 flush against and in alignment with the top sides of the fixed supports 162 and 163. In this manner, when an elevated key bar strikes against the bottom of the bar 160, the latter is free to yield.

This much describes the initiation of a character selection operation, that is, the depression of a selected key, elevation of the corresponding key bar into engagement with one or the other contact 161L or 161R and concomitant locking of the key bar in elevated position. The manner in which the main carriage 130 shifts in one direction or another the moment an elevated key bar engages one or another contact 161L or 161R is as follows:

Referring to Fig. 23, the terminals of the motor M are connected to a suitable source of electricity through wires 205 and 206. A transformer 207 is adapted to be supplied from the same source through wires 208 and 209, and a switch SW–1 is inserted to control the flow of electricity both to the motor M and the transformer 207. Thus, it will be seen that belt 141 will pass from left to right about the frame 140 only when switch SW–1 is closed and this condition will be assumed.

A pair of relays are afforded and are supplied from the transformer 207 by a wire 210, there being a normally closed limit switch in this line the purpose of which will be considered later in connection with character spacing. The left relay 200L corresponds to the left contact 161L and the right relay 200R corresponds to the right contact 161R. In Fig. 23, it will also be observed, as was noted above, that the middle contact 161M on the bar 160 is positioned above a corresponding key bar 175M which key bar 175M represents the character last embossed, or in other words, the key bar 175M identifies the at-rest position of the carriage 130 whereat the strikers 112M and 112F are located opposite the set of dies last actuated. Depending upon whether the character next selected at the keyboard K to be embossed is represented by a key bar to the left of 175M, as for instance 175L, or a key bar to the right, as for instance 175R, either the left contact 161L or the right contact 161R respectively will be engaged by an elevated key bar in the manner shown in Fig. 18. Of course, the same character on the keyboard K may be struck twice in which case the key bar as 175M last actuated will again be actuated to engage the middle contact 161M. As will be clear from the description to follow, this latter condition is also accounted for in the operation of our machine since it will be readily appreciated that under such circumstances there is no need to shift the carriage 130, for by definition the plate as PL is to receive an embossure from the same punch and die set as was last actuated and therefore it is only necessary to reactuate the strikers 112M and 112F. However, for the present purposes of disclosure and description of operation, it may be assumed that a key 170 represented by a key bar as 175R to the right of the bar 175M has been depressed causing the bar 175R to engage the right contact 161R, being held there by the lock bar 176 as above described.

The wire 210 leading from the transformer 207 leads into either relay and emerges from the respective relays as wires 210L and 210R respectively. In turn, wire 210L is connected to the left contact 161L and the wire 210R is connected to the right contact 161R. Each of the key bars is grounded as indicated in Fig. 23, and it will be seen therefore that when a key bar as 175R, to the right of the key bar 175M representing the set of dies last actuated, is locked in an elevated position a circuit through the right relay 200R is completed, the left relay 200L remaining deenergized or out of circuit.

A wire 211, electrically identified with the wire 210 leading from the transformer, is connected to a wire 212 that is identified with the relay contact grouping. The relay contact grouping comprises four contacts arranged in pairs: a normally closed, NC–R, and normally open contact NO–R associated with the right relay 200R, and an normally closed, NC–L, and normally open contact, NO–L, associated with the left relay 200L. Thus, at any moment when both relays are deenergized, both contacts NO–R and NO–L are open and both contacts NC–R and NC–L are closed; accordingly, when relay 200R is energized upon a key bar as 175R engaging the right contact 161R, contact NC–R is open and contact NO–R is closed. Consequently, current flows through the wires 210, 211, and 212, through the now closed contact NO-R, and out along wire 212R to the solenoid 210R associated with roller 145R. Solenoid 210R being grounded, its plunger 202R is drawn down.

Energization of solenoid 201L, to pull its plunger 202L down, is similar. Thus, upon a key bar to the left of 175M engaging the associated contact 161L, a circuit is completed to the relay 200L whereupon contact NC-L is opened and contact NO-L is closed, the relay 200R remaining deenergized with the contacts NC-R and NO-R remaining in their normal positions shown in Fig. 23. A circuit is thus completed to the solenoid 201L that is associated with the left run of the belt 141.

As best shown in Figs. 19 and 20, actuation of one or another plunger 202L or 202R causes one or another of the rollers 145L or 145R to press either the left or right run of the belt 141 against either the left-run plate 140L or right-run plate 140R of the frame 140. Thus, considering the plunger 202R, there is a collar 146 fixed in position thereon that is adapted to abut against an end of an arm 147 which is pivoted at 150. The other end of the arm 147 is fixed to a bracket 148 that is free to pivot about 149 and which rotatably carries the roller 145R so that when the plunger 202R is drawn down as viewed in Fig. 20 as the result of energization of the solenoid 201R the roller 145R is pivoted toward and into engagement with the right run of the belt 141. The stroke of the plunger 201R is adjusted to be such that the belt 141 is thus firmly clamped between the roller 145R and the plate 140R corresponding to the right run of the belt 141, a pressure roller 142 being afforded to assure efficiency of clamping. The frame 140, as a consequence, will move along with, and at a speed corresponding to that of, the belt 141 and will so continue until the solenoid 201R is deenergized in a manner to be described below, whereupon the arm 147, under the influence of a spring 147S, returns the roller 145R to its normal position.

Thus, the main carriage 130, to which the frame 140 is affixed by means of a pair of brackets as 134, will be carried to the right substantially simultaneously with the energization of solenoid 201R, and the strikers 112M and 112F will accordingly move relative to the support 110 toward the punch and die set corresponding to the depressed key 170. In the meantime, the solenoid 210R remains energized and continues as such until the main carriage 130 locates the strikers opposite the selected punch and die set, such locating of the carriage being determined by a means 135, Fig. 23, now to be considered.

The means 135, Figs. 12, 13, 14, 16, 18A, and 23, is located beneath the support 114 for the punch striker 112M and is adapted to travel with the main carriage 130 directly above the back top sides of the row of key bars 175 until the key bar which was elevated into locked position at the commencement of character selection is sensed by the means 135 whereupon the solenoid 201R (this being the solenoid assumed to be energized, it will be recalled) is deenergized and the carriage 130 locked in position with the strikers 112M and 112F located opposite the selected punch and die set. Thus, a pair of wiper blocks 136 and 137 are free to pivot on a short rod 138 that is supported between a pair of brackets 128 and 129, the latter being fixed to the center front of the main carriage 130. As best shown in Fig. 23, each of the wiper blocks comprises a back portion in the form of a small block through which the supporting rod 138 passes and a front overhanging portion 136T and 137T, Fig. 12, arcuately tapered down and in toward the inner end face. It is the portions 136T and 137T that constitute the sensing elements of the stop means 135 as will be appreciated presently. Springs 125 and 126, Fig. 14, urge the wipers toward a fixed spacer lug 127 that assures that the wipers are at all times maintained spaced apart from each other a distance just slightly greater than the width of any one of the key bars 175 so that an elevated one of the latter can be closely accommodated therebetween in an elevated position as shown in Fig. 18A. Another pair of springs 136S and 137S, one of each wiper, urge the wipers down toward the back top sides of the key bars and, at the same time, permit the wipers to be tilted up as shown in Fig. 13. It will be seen, therefore, that as the carriage 130 moves to the right during the time that roller 145R presses the right run of the belt 141 against plate 140R, the wipers will each ride above the rear ends of the key bars, the shallow end of the portion 137T of wiper 137 constituting the leading end. Accordingly, carriage 130 will reach a point in its travel whereat the beveled underside of the portion 137T of wiper 137 engages the end of the locked-up, elevated bar as 175R causing the wiper 137 to gradually tilt upward, as viewed in Figs. 23 and 18A, until the carriage 130 carries the wiper 137 to the right immediately beyond the elevated bar 175R whereupon the wiper 137 instantly drops down to its normal position immediately to the right of the key bar 175R as shown in Fig. 18A.

It will be appreciated that only in the event that a key bar 175 is elevated is the possibility presented that one or another of the contacts 161L, 161M, or 161R will be engaged by such a bar, and also that the spacing between the facing or inner ends of the contacts 161L and 161R, Figs. 15 and 18A, corresponds substantially to the spacing between the facing or inner ends of the wipers 136 and 137 so that substantially at the moment wiper 137, tilted up as above described, passes to the right of the bar as 175R and drops back down to normal position, the engagement between the end of this key bar and contact 161R is interrupted. Such interruption breaks the circuit to the solenoid 201R, and the roller 145R is pivoted away from the belt 141 resulting in an interruption of the drive to the main carriage 130. The configuration of the inner ends of the wipers 136 and 137 in effect amounts to abutments on either side of the actuated key bar 175R as best shown in Fig. 18A, thus assuring that the main carriage 130 is accurately and quickly located with the strikers 112M and 112F opposite the correct set of punches and dies in the support 110, springs 125 and 126, Fig. 14, functioning as shock absorbers.

As was noted above, interruption of the engagement between the corresponding contact 161 is accompanied by an engagement between the actuated key bar and contact 161M, as shown in Fig. 18A. The wipers 136 and 137, together with the spacing between the inner ends of the contacts 161L and 161R, assure that only this latter engagement is effected at this time, and under such circumstances both relays 200L and 200R are deenergized, as will be clear, and clutch 80 is engaged to characterize the commencement of an embossing operation.

*Embossing operation*

Referring to Fig. 23, a wire 213, electrically identical with the wire 210, leads from the relays to the solenoid 203 and another wire 214 leads from the solenoid 203 to the contact 161M. As shown in Fig. 18A, the wire 214 is connected to ground when the contact 161M engages the bar as 175R, and accordingly a circuit to the solenoid 203 is completed causing the plunger 65 to be pulled down thereupon engaging the clutch 80. Clutch 80 being engaged and the strikers 112M and 112F being positioned directly behind the punch and die corresponding to the character now to be embossed, the strikers each receive embossing impacts from the related drive bars 101M and 101F as was earlier discussed.

As shown best in Figs. 3 and 7, the punch and die support 110, in addition to punches and dies both upper and lower case, comprises a pair of upper elongated plates as 108 and 109 which extend from one end of the machine to the other and which are bolted to a lower and corresponding set of plates as 106 and 107, the latter being joined at their respective and opposite ends. Thus, the punches are located between the plates 106 and 108, and the dies between the plates 107 and 109, there being a guide plate or shelf as 103 and 104 for separating the lower case characters 110L from the upper case characters 110U. The whole punch and die support is movable vertically as a body in relation to the main supporting members 31 and 32 as will be discussed hereinbelow.

A relatively long universal spring as 114 and 115 is associated with each row of punches and dies and is tensioned so as to hold the particular rows, both upper and lower cases, away from the groove G in which the plate as PL may be positioned. As best shown in Fig. 3, tiny screws as 116 and 117 render either end of either spring adjustable, and rollers as 116R and 117R carried at the other ends of the screws as 116 and 117 are adapted to slide in fixed vertical ways whereby the springs 114 and 115 move with the support 110 and remain accurately positioned in relation thereto when the latter is adjusted for upper or lower case embossures as the case may be.

Thus, when energization of the solenoid 203 is effective to institute an embossing movement of the drive bars 101M and 101F simultaneously with stoppage of the main carriage 130 the selected punch and die set will be actuated toward the plate as PL to effect an embossure thereon, solenoid 203 remaining energized so long as the actuated and elevated key bar as 175R, Fig. 18A, remains engaged with the embossing control contact 161M. However, since it is not essential that the solenoid 203 remain energized after an embossure is effected, a means is afforded for automatically releasing the lock bar 176 that holds the elevated key bar as 175R in elevated position whereupon, it will be appreciated, the circuit to the solenoid 203 is broken. Such means in the present instance assumes the form of a rigid wire 102, Figs. 2, 3 and 19, that is connected to the end of one of the guide rods 98 and which terminates inside the machine, as shown in Fig. 19, closely adjacent to the lock bar 176. It will be seen therefore, that when the guide rod 98 moves in, the end of the rigid wire 202 will eventually engage the lock bar 176 whereupon further inward movement of the wire 102 will cause the lock bar to pivot back away from under the locked-up key bar, and the latter thereupon assumes its normal position under the influence of the bail 173, Fig. 18, and simultaneously therewith the depressed key. This un-grounds wire 214, the circuit to the embossing solenoid 203 is broken, and plunger 65 is released whereupon clutch 80 is free to disengage itself.

The above description is concerned, it will be recalled, with the initial depression of one of the keys 170 which corresponds to a key bar located to the right of the bar as 175M last actuated. Thus, description was had with respect to the actuation of a key bar as 175R, and after an embossure is effected this key bar will be located directly beneath the contact 161M as is the bar 175M shown in Fig. 23. Movement of the carriage 130 to the left of the bar 175M, Fig. 23, is precisely the same except that when a bar as 175L is raised and locked by the means 176 in an elevated position to engage the contact 161L, solenoid 201L is energized through the relay 200L, and the roller 145L is thereupon pivoted to pick up the left run of the belt 141. The carriage 130 is moved to the left until the contact 161M engages the elevated and locked-up key bar, causing the embossing solenoid 203 to be energized through the wires 213 and 214 and plunger 65 to be pulled down. Simultaneously with the stoppage of the carriage 130 in its movement to the left, solenoid 201L is deenergized. An embossure is thereafter effected, and at the same time the wire 102 engages the lock bar 176 causing the embossing solenoid 203 to be deenergized.

Assuming that two successive embossures are to be made from the same punch and die, it will be seen that there is no need to move the carriage 130 (the manner in which the plate as PL is character spaced will be considered presently) from the position assumed by it in relation to the key bar as 175 last actuated. Thus, referring to Fig. 23, if the bar 175M represents the bar last actuated as well as the one next to be actuated, depression of the corresponding key on the keyboard K simply moves the bar 175M into re-engagement with the contact 161M whereat it is locked by the lock bar 176. Therefore, neither solenoid 201L or 201R is energized during this operation, but rather 203 alone, and a repeat embossure is effected directly unaccompanied by any movement of the main carriage 130. Of course, as in the case of any successive embossures, the plate PL must be character spaced, and the means whereby this is accomplished will now be considered.

*Character spacing*

Since all solenoids so far considered, namely 201L, 201R, and 203, are deenergized immediately after or at the time an embossure is effected, and during the time that arm 73 is returned to its normal position, such time lapse represents a convenient period in which to shift the plate carriage 240 to the left in relation to the main carriage 130 as viewed in Fig. 1 so that the plate PL is positioned to receive a new embossure in an unembossured area on the particular line immediately to the right of the character last embossed. In the present instance, this operation is an automatic one, but since lateral spacing is also required between words on the same line, a manual means is also afforded for character spacing.

In the present instance, the character spacing operation is controlled by a switch SW–2, Fig. 23, that is adapted to be closed momentarily at the time an embossure is effected, but it will be appreciated that such may be effected at almost any moment during the time taken by arm 75F to return to normal position following an embossure operation, the switch SW–2 remaining open at all other times. When this switch SW–2 is thus closed, a circuit is completed to a fourth solenoid 202, Figs. 6 and 23, whereupon a lever 220 is rocked clockwise on a pivot at 221. When the switch SW–2 is opened again at a second stage during the same return movement of the arm 75F, the lever 220 rocks counter-clockwise causing the worm 250, Fig. 21, to turn a predetermined distance to move the plate carriage 240 in relation to the main carriage 130.

Referring in detail to Figs. 6, 21, and 23, the switch SW–2 comprises one contact 198 which is connected to ground and another contact 199 which is electrically identical with a wire 197 from which another electrically identical wire 196 leads into the solenoid 202. Wire 197 terminates at one contact 194 of another switch SW–4, the other contact of the latter switch being adapted to be connected to ground on a spacer bar 190, Fig. 2. Another wire 195 interconnects the solenoid 202 with the wire 210 leading from the transformer 207 so that the solenoid 202 will receive current when either switch SW–2 or SW–4 is closed.

The switch SW–2 is of a known type in that it is adapted to be momentarily closed at the instant an embossure is effected by the strikers 112M and 112F. That is, the contact 198 moves with the arm 75F and engages the contact 199 substantially at the instant a die as 110F is struck, contact 199 being relatively stationary. At this moment the solenoid 202 is energized, causing a plunger 222 controlled thereby to be drawn down whereupon the plunger 222 being connected to the lever 220 rotates the latter clockwise, as viewed in Fig. 6, against the action of a spring 223. As shown in detail in Fig. 6A, the lever 220 pivotally carries a dog 224 at one end, this dog being associated with a plurality of pins 224P which project from a rotatable disc 225 into the path of the dog. When the lever 220 is pulled down at the one end by the plunger 222, the dog 224 at the other end will be carried upward to the position indicated in Figs. 6A and away from the pin 224P–1 which marks the normal or at-rest position of the lever 220. At the end of this downward stroke of the plunger 222, dog 224 is located above the next pin 224P–2 as shown, disc 225 remaining stationary all the time. Accordingly, when the solenoid is deenergized, lever 220 is free to be returned to normal position by the now-tensioned spring 223, and the dog 224 drivingly bears against pin 224P-2 causing disc 225 to turn counter-clockwise to a new position.

The circular distance between the pins 224 corresponds to the spacing between characters. Thus and referring to Fig. 21, the disc 225 is fixed to one end of a square shaft 227 that extends from one end of the machine to the other, passing coaxially through the worm 250. The worm drive 250 is journaled in a pair of brackets 228 and 229 that are fixed to the main carriage 130, and the openings at its opposite ends, through which the shaft 227 emerges, are squared so that in effect the worm 250 is keyed to the shaft 227 but yet is adapted to slide thereon. Thus, since the opposite ends of the worm are shaped in conformance with the square shaft 227, any turning of the latter will also cause the worm to turn in the brackets 228 and 229, while on the other hand the worm will be carried along with the main carriage 130 during character selection, the shaft 227 being longitudinally immovable.

During the character spacing operations, the plate carriage 240 is adapted to slide in, and is guide in part by, a pair of rails 247 and 248. To this end, the plate carriage includes a pair of upright members 241 and 242 spaced apart from each other a distance corresponding to the width of a plate as PL, and on the inside each carries a bracket 243, 244, Figs. 17 and 19. In turn, the brackets 243 and 244 amount an elongated plate 245 that extends from one end of the plate carriage 240 to the other. As a means for translating the circular movement of the worm 250 into a lateral movement of the plate carriage 240, the worm is adapted to turn in a nut 246, Figs. 17 and 19 that is carried by the plate 245. Therefore, for each counterclockwise turning of the worm 250 by the means 224–224P–225–227, as viewed from the position of Fig. 6, the nut 246 steps the plate carriage 240 to the right as viewed in Fig. 21, the upper and lower edges of the plate 245 sliding in the rails 247 and 248. During character spacing, the main carriage 130 remains stationary of course, and therefore the character spacing movement of the plate carriage 240 can be viewed as a movement in relation to the strikers 112M and 112F. For instance, if first and second successive embossures of the same character be considered it will be seen that in between the first and second embossures the only carriage movement will be that of the plate carriage which is simply shifted one character space so as to present an unembossed area of the plate PL to the strikers 112M and 112F, the latter remaining in position opposite the punch and die set selected for the repeat embossure.

The manual character spacing operation should be clear enough, the only difference being that solenoid 202 is connected to ground when the switch SW-4 is closed as the result of depressing the spacer bar 190. Nevertheless, such a manual operation follows ordinarily upon the automatic operation considered above, that is, a double space is afforded between words.

It is desirable of course that marginal borders be maintained on the article being embossed, and this is attained through means that limit movement of the plate carriage 240 to a predetermined extent in either direction. In the present instance, such means include a normally closed limit switch that is opened when the plate carriage 240 has been stepped to the left a predetermined number of times as viewed in Fig. 1, and also a fixed stop means that assures that a left-hand margin is maintained on the other hand. Considering Figs. 10, 11, 21 and 23, it will be observed that a normally closed switch SW-3 is inserted in the line 210 leading from the transformer 207 into the relays 200L and 200R so that when this switch is opened it is impossible for either the relay system or the embossing control solenoid 203 to be energized. Such opening of the switch SW-3 is accomplished as follows:

The end of the square shaft 227 away from the disc 225 carries a small gear 260 that is meshed with a larger gear 261, so that as the turning of the worm 250 accounts for a shifting of the plate carriage 240 the larger gear 261 tends to be rotated in a counter-clockwise direction as viewed in Fig. 10, the shaft for gear 261 being suitably journaled at the right hand end of the machine. A pin 262, Fig. 10, is fixed to the gear 261 and projects inwardly thereof toward the opposite end of the machine. The pin 262 is so disposed on gear 261 that as the latter is turned counter-clockwise by gear 260, as viewed in Fig. 10, it eventually assumes a position one step removed from the normally engaged contacts 192 and 193 of switch SW-3 at the completion of a particular character spacing operation. Consequently, upon gear 260 turning gear 261 during the next character spacing operation following directly upon the corresponding embossing operation pin 262 breaks the contact at 192—193 thereby disabling the relays as well as solenoid 203. Further embossures on this particular line of the plate as PL are impossible, and in this manner definition may be automatically had of the right margin of the plate. Moreover, the gear 261 carries a second pin 263 that is adapted to bear against one end 266 of an elongated lever 264 (see Fig. 16), at the same time the above disabling action occurs, to pivot the lever 264 upward as viewed in Fig. 10 about a pivot 265, Fig. 16. The other end of the lever 264 is bent as at 266, Fig. 16, and is adapted to engage the lock bar 176 when lever 264 is pivoted upward as aforesaid. Accordingly, the lock bar 176 is itself pivoted backward about the member 178, Fig. 18, and is held away from the inclined ends of the key bars so long as pin 263 remains engaged with the end 266 of lever 264. Consequently, it is impossible to lock any one of the key bars 175 in an elevated position, and so any key as 170 will spring back to normal position if there is an attempt by the operator to initiate a character selection operation.

When the right hand margin of the article being embossed is thus reached, or for that matter at any time such article has been character spaced to the left during successive embossing operations or has otherwise been shifted beyond its left hand marginal limit by the carriage 240, the latter may be moved from left to right in relation to the machine as viewed in Fig. 2 merely by manually depressing and holding down the end of the lever 220 corresponding to the plunger 222 and thereupon turning the large gear 261 clockwise as viewed in Fig. 10 by means of the handle 261H that is afforded for such a purpose. This manual turning of the gear 261 is manifest in a counter-clockwise turning of both the gear 260 and the square shaft 227 to which it is affixed as viewed from the position of Fig. 10, and disc 225, Fig. 6A, affixed to the other end of shaft 227 will turn clockwise. Thus, it will be seen that the shaft 227, and therefore the worm 250, will be rotated opposite to the direction of rotation required for character spacing thereby causing the plate carriage 240 to be shifted accordingly by the nut 246. When the plate as PL in the carriage 240 is thus manually located by rotating the gear 261 through the required distance, lever 220 is released, and as will be appreciated from Fig. 6A the dog 224 will hold the disc 225 against any accidental or inadvertent tendencies toward a clockwise turning, as in any case where the lever 220 assumes a normal position.

Referring again to Fig. 6A, it will be observed that at the end of the lever 220 corresponding to the dog 224, there is fixed a lug 226, and the purpose of this lug, it will be observed, is to prevent any accidental or inadvertent counter-clockwise turning of the disc 225. Thus, in one sense the lug 226 acts as a stop; therefore, when the lever 220 is manually depressed as aforesaid, to assume the position shown in Figs. 6 and 6A, the lug 226 will be carried upward and out of the path of the pins 224P whereupon by manually turning gear 261 counter-clockwise as viewed in Fig. 10, the shaft 227 can be given any number of turns in a direction corresponding to that of its character spacing movement, at least to the extent that the plate carriage 240 is free to undergo synthetic character spacing from right to left in the machine.

Line spacing and punch and die shifting

When a particular line of embossed data has been completed on an article such as the plate PL, it is necessary that a means be afforded for exacting a vertical spacing operation. In the present instance the line spacing means assumes the form of a rack and pinion arrangement, Fig. 21, that is adapted to exert a force against the bottom of the plate as PL to lift the same in relation to the carriage 240. To this end, the plate as PL is adapted to slide in vertical ways provided in the supports 241 and 242 as the result of any vertical movement imparted to a friction clamping member 277 which holds the bottom of the plate or article being embossed as PL. In turn, the holder 277 is fixed to a rack 270 which itself is adapted to slide in the vertical ways provided in the members 241 and 242 of the carriage 240, and it is this vertical movement of the rack 270 that may characterize a line spacing operation.

Another square shaft 275, below and somewhat to the rear of the shaft 227, extends from one end of the machine to the other, and this shaft may be turned in either direction by a knob 276, Figs. 10 and 21, carried at one end thereof. The supports for the shaft 275 include a pair of spaced apart brackets 273 and 274, one on each of the plate carriage support members 241 and 242. Concentric to the shaft 275 and extending between the brackets 273 and 274 is another shaft 269 which carries a pinion, 271 and 272, at either end. The pinions are each provided with teeth as 272T, Fig. 22, that are aligned with and adapted to engage in spaced apart holes as 270H which are arranged in vertical rows on opposite sides of the rack 270 so that when the pinions turn together as the result of turning the shaft 269 the rack is raised or lowered as the case may be. To this end, shaft 269 is keyed to the square shaft 275 in a manner similar to that between the worm 250 and its associated shaft 227, and therefore when the knob 276 is turned clockwise as viewed in Fig. 10, the rack 270 raises the plate as PL, the spacing between successive holes as 270H and successive teeth as 272T corresponding to the spacing between lines as on the embossed article shown in Fig. 9.

Any particular line position imparted to the rack 270 by a turning of the pinions 271 and 272 is held by a roller 279, Fig. 22, mounted at one end of a spring plate 278, and it will be seen that the roller 279 prevents inadvertent displacement of the rack 270.

In order that the punch and die support 110 may be raised and lowered in relation to the machine as shown in Fig. 8 so as to permit shifting of the upper case punches and dies 110U into the path of embossing travel of the strikers 112M and 112F, the opposite ends of the support 110 are connected each to an upstanding rod 286 and 287, Figs. 6, 8, and 10. The rods 286 and 287 are so mounted in the machine that they are free to be moved vertically up and down so that the support 110 is carried accordingly. Shifting of the punch and die support is under control of a shift key 280, Fig. 8, that is carried at one end of a lever 281. The other end of the lever 281 is made fast to a rock shaft 282, and a pair of levers 284 and 285 are fast on opposite ends of the rock shaft 282. The other ends of the levers 284 and 285 are connected to the rods 286 and 287, and it will be seen therefore that when the key 280 is depressed, the rods 286 and 287, and therefore the support 110, will undergo a vertical shifting movement upward and the upper punches and dies 110U will be located opposite the strikers 112M and 112F. Each of the rods 286 and 287 carry fixed lugs or collars as 288 and 298, Fig. 8, that define the extent of movement required of the support 110, and springs as 286S are afforded to counterbalance the weight of the punch and die support.

Considering the character selection, embossing operation, and character spacing movements of the machine as a cyclic entity, it may first be pointed out the character spacing movement of the last cycle of operation will have located the article or plate being embossed such that an unembossed portion of the plate immediately to the right of the last embossure thereon will be located directly in line with the punch and die set which effected the aforesaid last embossure, and since the main carriage 130 remains stationary during the character spacing operation of the plate carriage 240, the strikers 112M and 112F will remain disposed behind the aforesaid punch and die set, or in other words, related directly to the aforesaid unembossed area of the plate. Initiation of the next complete cycle of operation is commenced by depressing the key on the key board K corresponding to the punch and die set next to be actuated, and assuming that such set does not represent a repeat embossure, the main carriage, and therefore the punch and die strikers, will move directly and over the shortest path from the punch and die set last actuated to the set next to be actuated. Of course, the plate carriage remains stationary in relation to the main carriage during this character selection movement of the latter, and therefore the aforesaid relation between the unembossed area of the plate and the strikers 112M and 112F is maintained. Accordingly, the aforesaid unembossed area of the plate will be disposed opposite the punch and die set next to be actuated when the sensing means carried by the main carriage locates the corresponding raised key bar. When the aforesaid unembossed area of the plate, the punch and die strikers, and the punch and die set next to be actuated are thus aligned, the latter is actuated, a new embossure immediately to the right of the last is effected, and a character spacing movement is instituted. During a character spacing movement, the plate carriage is moved to the left in relation to the main carriage, this being of particular significance at the punch and die strikers whereat the last embossed area of the plate, now representing the aforesaid unembossed area, will move past the strikers to dispose a new unembossed area therebetween. When a new unembossed area is thus presented to the punch and die strikers, the cycle is completed.

During a character selection operation, the movement is a relative movement between the means that support the punches and dies and the means that support the article being embossed, so that in effect a newly selected punch and die set is presented to, or disposed opposite, the unembossed area of the article immediately to the right of the last embossure thereon, and since relative movement starts from the set last actuated and ends at the set next to be actuated, this relative movement takes place over a path that is represented by and related to the shortest distance between the two sets of punches and dies in the means that supports them. Thus, while we have illustrated and described the preferred embodiment of our invention, it is to be understood that these are capable of variation and modification, and we therefore do not wish to be limited to the precise details set forth, but desire to avail ourselves of such changes and alterations as fall within the purview of the following claims.

We claim:

1. An embossing machine comprising punches and dies arranged in sets in a supporting member, a holder member for holding an article to be embossed in embossing relation to the supporting member, means for selecting the punches and dies for actuation to effect successive selected embossures on the article, means to move the article a character space distance along a line after any first one selected punch and die operation whereby an unembossed area of the article may be arranged to receive a second selected embossure, means for moving one of said members relative to the other subsequent to and independently of the character space movement whereby to dispose any second and different selected punch and die set opposite said unembossed area, the last-named means being operable by and upon actuation of the selector means, and means for directing said relative movement over the shortest distance directly between the said first and second punch and die sets.

2. In an embossing machine having a supporting member for punches and dies arranged therein for selective operation and related actuation whereby to effect different embossures in a line on an article positionable in the machine, and in which machine there is provided a carriage member for holding the article in embossing relation to the punch and die supporting member, means for initiating a selective operation of a particular punch and die set, means for automatically effecting relative movement between the said members as an incident to actuation of the initiating means whereby to dispose said particular punch and die set opposite an unembossed area of the article positionable in the machine, means directing said relative movement over a direct path corresponding to the shortest distance in the said supporting member between the punch and die set last actuated and the said particular punch and die set next to be actuated, and means for actuating said particular punch and die set at the end of said relative movement.

3. An embossing machine comprising different punch and die pairs arranged in a set, means for selecting a particular pair for actuation to effect a corresponding embossure on an article positionable in a holder in the machine, the holder being located adjacent the set of punches and dies, means for effecting relative movement between the holder and set along and over the path representing the shortest distance in the set between the punch and die pair last actuated and the punch and die pair next to be actuated, the last-named means being automatically operable as an incident to actuation of the selector means, and means actuating the selected punch and die pair following the termination of said relative movement.

4. An embossing machine comprising a punch and die supporting member having a plurality of different punch and die sets arranged in spaced apart relation therein, means to select any particular punch and die set for actuation to effect a corresponding embossure on an article positionable in the machine, a supporting member for said article adjacent the punch and die supporting member, means to move one of said supporting members relative to the other to dispose a newly selected punch and die set opposite an unembossed area of the article, said last-named means being operable by and upon actuation of the selector means corresponding to the said newly selected punch and die set, means to direct said relative movement over the path corresponding to the shortest direct distance between the punch and die set last selected and the said newly selected punch and die set, means to actuate the said newly selected punch and die set following upon said relative movement, and means to character space the article supporting member in relation to the punch and die supporting member.

5. An embossing machine comprising a punch and die supporting member having a plurality of different punch and die sets arranged in spaced apart relation therein, means to select any particular punch and die set for actuation to effect a corresponding embossure on an article positionable in the machine, a supporting member for said article adjacent the punch and die supporting member, means to move one of said supporting members relative to the other to dispose a newly selected punch and die set opposite an unembossed area of the article, said last-named means being operable by and upon actuation of the selector means corresponding to the said newly selected punch and die set, and means to direct said relative movement over the path corresponding to the shortest direct distance between the punch and die set last selected and the said newly selected punch and die set.

6. An embossing machine comprising a punch and die supporting member having a plurality of different punch and die sets arranged in spaced apart relation therein, means to select any particular punch and die set for actuation to effect a corresponding embossure on an article positionable in the machine, a supporting member for said article adjacent the punch and die supporting member, means to move one of said supporting members relative to the other to dispose a newly selected punch and die set opposite an unembossed area of the article, said last-named means being operable by and upon actuation of the selector means corresponding to the said newly selected punch and die set, means to direct said relative movement over the path corresponding to the shortest direct distance between the punch and die set last selected and the said newly selected punch and die set and means to actuate the said newly selected punch and die set following upon said relative movement.

7. An embossing machine comprising a plurality of different punch and die sets, a stationary supporting member in which said punch and die sets are arranged, a main carriage movable in relation to the supporting member, a plate carriage movable with and relative to the main carriage, means to select punch and die sets for embossing actuation, drive means to move the main carriage and plate carriage together following upon and as an incident to actuation of the selector means whereby the carriages move directly from the punch and die set last actuated to the punch and die set next to be actuated and over the shortest distance therebetween, means to actuate the selected punch and die sets after the carriages are located opposite the punch and die set next to be actuated, and means to character space the plate carriage.

8. In an embossing machine, a supporting member, a plurality of different punch and die sets arranged in said supporting member and allocated respectively to the formation of different embossures on an article positionable in the machine, an article-mounting member for supporting an article in embossing relation with respect to a selected punch and die set, means mounting a first one of said members for movement in opposite directions relative to the second one of said members to establish said embossing relation between such an article and any selected punch and die set, selecting means for selecting the desired punch and die set for operation through an embossing cycle, actuating means for selectively moving said one member in one direction or the other from a previously established embossing relation to a newly selected embossing relation, and means governed by said selecting means and by such previously established embossing relation to render said actuating means effective to move said one member directly to said newly selected embossing relation in the direction which will establish such newly selected relation with the minimum amount of movement of said first member.

9. An embossing machine comprising a supporting member, a plurality of different punch and die sets arranged in said supporting member and actuatable to effect different embossures along a line on an embossable article positionable in the machine, an article-holding member for supporting such an article in embossing relation to a selected punch and die set, one of said members being mounted in the machine for movement in opposite directions to establish such an embossing relation between such an article and such a selected punch and die set, selector means for selecting the punch and die set to be actuated, actuating means to move one of said supporting and holding members in one direction or another relative to the other member from a previously established embossing relation to a newly selected embossing relation, and means governed by said selector means and indexed to such previously established embossing relation to render said actuating means effective in one direction to move said one member directly to the position corresponding to said newly selected embossing relation and over the shortest path.

10. An embossing machine comprising a supporting member, a plurality of different punch and die sets arranged in said supporting member and actuatable to effect different embossures along a line on an embossable article positionable in the machine, an article-holding member for supporting such an article in embossing relation to a selected punch and die set, one of said members being mounted in the machine for movement in opposite directions to establish such an embossing relation between such an article and such a seelcted punch and die set, selector means for selecting the punch and die set to be actuated, actuating means to move one of said supporting and holding members in one direction or another relative to the other member from a previously established embossing relation to a newly selected embossing relation, means governed by said selector means and indexed to such previously established embossing relation to render said actuating means effective in one direction to move said one member directly to the position corresponding to said newly selected embossing relation and over the shortest path, and striker means to cause the selected punch and die set to be actuated after said actuating means for the said one member are effective.

11. An embossing machine comprising a supporting member, a plurality of different punch and die sets arranged in said supporting member and actuatable to effect different embossures along a line on an embossable article positionable in the machine, an article-holding member for supporting such an article in embossing relation to a selected punch and die set, one of said members being mounted in the machine for movement in opposite directions to establish such an embossing relation between such an article and such a selected punch and die set, selector means for selecting the punch and die set to be actuated, actuating means to move one of said supporting and holding members in one direction or another relative to the other member from a previously established embossing relation to a newly selected embossing relation, means governed by said selector means and indexed to such previously established embossing relation to render said actuating means effective in one direction to move said one member directly to the position corresponding to said newly selected embossing relation and over the shortest path, striker means to cause the selected punch and die set to be actuated after said actuating means for the said one member are effective, and character space means operable after said actuation of the selected punch and die set.

12. In an embossing machine having a supporting member, a plurality of punch and die sets arranged in said supporting member for selective actuation to effect selective different embossures along a horizontal line on an embossable article, an article-holding member for such an embossable article adapted to dispose such an article in embossing relation to selected punch and die sets, means mounting one of said supporting and holding members for movement in opposite directions in relation to the other whereby any first and any next successive selected punch and die set may be disposed in embossing relation to respective and contiguous embossable areas along such a line on such an article, the said first punch and die set representing the last set actuated to effect an embossure and the said next successive punch and die set representing the next set to be actuated to effect an embossure, means to direct said relative movement of said one member over the path corresponding to the shortest distance between the said first and next successive punch and die sets, said last-named means comprising an indexing means carried by the said one member to locate the said one member in relation to the said first punch and die set following an embossure taken therefrom, detecting means carried by the said one member to determine in which direction the said next successive punch and die set is removed from the said first punch and die set, and means for effecting said relative movement in a direction corresponding to the direction determined by the detecting means.

13. In an embossing machine having a supporting member, a plurality of punch and die sets arranged in said supporting member for selective actuation to effect selective different embossures along a horizontal line on an embossable article, an article-holding member for such an embossable article adapted to dispose such an article in embossing relation to selected punch and die sets, means mounting one of said supporting and holding members for movement in opposite directions in relation to the other whereby any first and any next successive selected punch and die set may be disposed in embossing relation to respective and contiguous embossable areas along such a line on such an article, the said first punch and die set representing the last set actuated to effect an embossure and the said next successive punch and die set representing the next set to be actuated to effect an embossure, means to direct said relative movement of said one member over the path corresponding to the shortest distance between the said first and next successive punch and die sets, said last-named means comprising an indexing means carried by the said one member to locate the said one member in relation to the said first punch and die set following an embossure taken therefrom, detecting means carried by the said one member to determine in which direction the said next successive punch and die set is removed from the said first punch and die set, and means for effecting said relative movement in a direction corresponding to the direction determined by the detecting means, the machine including means to actuate the said next successive punch and die set to effect an embossure therefrom after the termination of said relative movement, and means to afford a character spacing operation following the embossure from the said next successive punch and die set.

14. An embossing machine comprising a supporting member, a plurality of punch and die sets arranged in said supporting member for selective actuation to effect selective successive embossures along a horizontal line on an embossable article, an article-holding member in the machine for such an article to dispose the same in embossing relation to successive selected punch and die sets, means mounting one of said supporting and holding members for movement in opposite directions in relation to the other whereby any first and any next successive selected punch and die set may be disposed in embossing relation to respective and contiguous embossable areas along such a line on such an article, the said first punch and die set representing the last set actuated to effect an embossure and the said next successive punch and die set representing the next set to be actuated to effect an embossure, means to direct said relative movement of said one member over the path corresponding to the shortest distance between the said first and next successive punch and die sets, said last-named means comprising an indexing means carried by the said one member to locate the said one member in relation to the said first punch and die set following an embossure taken therefrom, detecting means carried by the said one member to determine in which direction the said next successive punch and die set is removed from the said first punch and die set, and means for effecting said relative movement in a direction corresponding to the direction determined by the detecting means.

15. An embossing machine comprising a supporting member, a plurality of punch and die sets arranged in said supporting member for selective actuation to effect selective successive embossures along a horizontal line on an embossable article, an article-holding member in the machine for such an article to dispose the same in embossing relation to successive selected punch and die sets, means mounting one of said supporting and holding members for movement in opposite directions in relation to the other whereby any first and any next successive selected punch and die set may be disposed in embossing relation to respective and contiguous embossable areas along such a line on such an article, the said first punch and die set representing the last set actuated to effect an embossure and the said next successive punch and die set representing the next set to be actuated to effect an embossure, means to direct said relative movement of said one member over the path corresponding to the shortest distance between the said first and next successive punch and die sets, said last-named means comprising an indexing means carried by the said one member to locate the said one member in relation to the said first punch and die set following an embossure taken therefrom, detecting means carried by the said one member to determine in which direction the said next successive punch and die set is removed from the said first punch and die set, and means for effecting said relative movement in a direction corresponding to the direction determined by the detecting means, the machine including means to actuate the said next successive punch and die set to effect an embossure therefrom after the termination of said relative movement, and means to afford a character spacing operation following the embossure from the said next successive punch and die set.

16. An embossing machine comprising a punch and die supporting member having arranged therein a plurality of punch and die sets, means to select one or another of said punch and die sets for effecting successive respective embossures along a line on an embossable article positionable in the machine, an article-holding member to dispose such an article in embossing relation to successive selected punch and die sets, means to actuate the selected punch and die set when such an article is so disposed, said article-holding member being movable in either direction relative to the supporting member to embossably dispose such an article first to one and then to any next successive selected punch and die set, and means to so relatively move the article-holding member over the shortest distance between successive selected punch and die sets, said last-named means including elements each shiftable from one position to another accordingly as an associated punch and die set is selected, means carried by the article-holding member to index the article-holding member to the shiftable element corresponding to the punch and die set last actuated, means carried by the article-holding member to determine if the shiftable element corresponding to the punch and die set next selected to be actuated is to the left or right of the shiftable element corresponding to the punch and die set last actuated, means to drive the article-holding member to the left or right accordingly as the punch and die set next to be actuated is determined to be to the left or right of the punch and die set last actuated, and means to disable the driving means when the article-holding member reaches a position corresponding to the shiftable element corresponding to the punch and die set next to be actuated.

17. An embossing machine comprising a punch and die supporting member having arranged therein a plurality of punch and die sets, means to select one or another of said punch and die sets for effecting successive respective embossures along a line on an embossable article positionable in the machine, an article-holding member to dispose such an article in embossing relation to successive selected punch and die sets, means to actuate the selected punch and die set when such an article is so disposed, said article-holding member being movable in either direction relative to the supporting member to embossably dispose such an article first to one and then to any next successive selected punch and die set, and means to so relatively move the article-holding member over the shortest distance between successive selected punch and die sets, said last-named means including movable elements each identified with a punch and die set and each adapted to be shifted from one position to another upon selection of the corresponding punch and die set, means to index the article-holding member to the one element corresponding to the punch and die set last actuated, means to detect if the one element corresponding to the punch and die set next selected to be actuated is on one side or another of the indexing means, means to effect said relative movement of the article-holding member in one direction or the other according to the side thus detected, and means to stop said relative movement when the article-holding member has traversed a distance corresponding to the shortest distance between the said one elements.

18. An embossing machine comprising a punch and die supporting member having arranged therein a plurality of punch and die sets, means to select one or another of said punch and die sets for effecting successive respective embossures along a line on an embossable article positionable in the machine, an article-holding member to dispose such an article in embossing relation to successive selected punch and die sets, means to actuate the selected punch and die set when such an article is so disposed, said article-holding member being movable in either direction relative to the supporting member to embossably dispose such an article first to one and then to any next successive selected punch and die set, and means to so relatively move the article-holding member over the shortest distance between successive selected punch and die sets, said last-named means including elements each shiftable from a normal to an actuated position accordingly as the punch and die set associated therewith is selected for actuation, means to index the article-holding member to the one shiftable element corresponding to the punch and die set last actuated, means associated with the indexing means to determine if the one shiftable element corresponding to the punch and die set next selected to be actuated is on one side or the other of the said first one shiftable element, and means to direct said relative movement of the article-holding member in one direction or the other accordingly as the said second one shiftable element is on one side or the other respectively of the said first one shiftable element.

19. An embossing machine comprising a punch and die supporting member having arranged therein a plurality of punch and die sets, means to select one or another of said punch and die sets for effecting successive respective embossures along a line on an embossable article positionable in the machine, an article-holding member to dispose such an article in embossing relation to successive selected punch and die sets, means to actuate the selected punch and die set when such an article is so disposed, said article-holding member being movable in either direction relative to the supporting member to embossably dispose such an article first to one and then to any next successive selected punch and die set, and means to so relatively move the article-holding member over the shortest distance between successive selected punch and die sets, said last-named means including elements each shiftable from a normal to an actuated position and each being associated with a corresponding punch and die set, each element being so shiftable accordingly as the corresponding punch and die set is selected for actuation, a sensing means normally associated with the one shiftable element corresponding to the punch and die set last actuated, a locating means associated with the sensing means to determine if the one shiftable element corresponding to the punch and die set next selected to be actuated is located on one side or the other of the said first one shiftable element, and means to direct the relative movement of the article-holding member in one direction or another accordingly as the said second one shiftable element is located on one or the other side respectively of the said first one shiftable element, the last-named means being effective until the sensing means senses the shifted condition of the said second one shiftable element.

20. An embossing machine according to claim 19 in which the sensing means and locating means are movable with the article-holding member.

21. An embossing machine comprising a punch and die supporting member having arranged therein a plurality of punch and die sets, means to select one or another of said punch and die sets and to effect successive respective spaced-apart embossures on an article positionable in the machine, an article-holding member to dispose such an article in embossing relation to successive selected punch and die sets, means to actuate the selected punch and die set when an article is so disposed, a first one of the supporting and holding members being movable in opposite directions relative to the other to embossably dispose such an article first to one and then to any next successive selected punch and die set, and means to so relatively move the first one member with respect to the other over a path corresponding to the shortest distance between any successively selected punch and die sets, said last-named means including elements each shiftable to an actuated position accordingly as a corresponding punch and die set is selected for actuation, sensing means normally associated with the one shiftable element corresponding to the punch and die set last actuated, locating means associated with the sensing means to locate the one shiftable element corresponding to the punch and die set next selected to be actuated either on one side or the other of the said first one shiftable element, and means to direct said relative movement of the said first one of the members either in one direction or the other with respect to the other member accordingly as the said second one shiftable element is located on one side or the other of the said first one shiftable element.

22. An embossing machine according to claim 21 in which the sensing and locating means are carried by the said first one of the members that is movable relative to the other.

23. An embossing machine comprising a punch and die supporting member having arranged therein a plurality of punch and die sets, means to select one or another of said punch and die sets and to effect successive respective spaced-apart embossures on an article positionable in the machine, an article-holding member to dispose such an article in embossing relation to successive selected punch and die sets, means to actuate the selected punch and die set when an article is so disposed, a first one of the supporting and holding members being movable in opposite directions relative to the other to embossably dispose such an article first to one and then to any next successive selected punch and die set, and means to so relatively move the first one member with respect to the other over a path corresponding to the shortest distance between any successively selected punch and die sets, said last-named means including elements each shiftable to an actuated position accordingly as a corresponding punch and die set is selected for actuation, sensing means normally associated with the one shiftable element corresponding to the punch and die set last actuated, locating means associated with the sensing means to locate the one shiftable element corresponding to the punch and die set next selected to be actuated either on one side or the other of the said first one shiftable element, and means to direct said relative movement of the said first one of the members either in one direction or the other with respect to the other member accordingly as the said second one shiftable element is located on one or the other side of the said first one shiftable element, the last-named means being ineffective to so direct said relative movement after the sensing means is associated with the said second one shiftable element.

24. An embossing machine according to claim 23 in which the sensing and locating means are carried on and movable with the article-holding member.

25. In an embossing machine having a carriage which is movable in either of two opposite directions, a drive and control means for said carriage including an endless belt having a first and second run corresponding respectively to the one and the other of the said two opposite directions, engageable means fixed to the carriage adapted to be engaged either by the said one or the said other run of the belt to thereby cause the carriage to be carried in the one or the other direction, and selectively actuable means to cause the engageable means to be so engaged by one or the other run of the belt, the last-named means including a pair of selectively operable clamping members one for each run of the belt to clamp one or the other run thereof to the engageable means, and means to select one of the clamping members for operation.

26. In an embossing machine having a carriage which is movable in either of two opposite directions from an at-rest position which may vary between successive operations, a drive and control means for said carriage including an endless belt having a first and second run corresponding respectively to the one and the other of the said two opposite directions, engageable means fixed to the carriage and adapted to be engaged either by the said one or the said other run of the belt to thereby cause the carriage to be carried in the one or the other direction, and selectively actuatable means to cause the engageable means to be so engaged by one or the other run of the belt, the last-named means including a pair of selectively operable clamping members one for each run of the belt to clamp one or the other run thereof to the engageable means, means to automatically index the last at-rest position of the carriage following a cycle of operation thereof to the next selected movement for the carriage, and actuating means to actuate one or the other clamping member to clamping position, the actuating means being under control of the indexing means whereby only the clamping member corresponding to the selected directional movement of the carriage is actuated.

27. In an embossing machine having punches and dies disposed opposite one another in respective rows, a toggle mechanism comprising a toggle joint adapted to exert an applied force in the direction of the punches and dies, a connecting arm for operating the toggle and being movable in opposite directions along a line generally at right angles to the direction of said force to be applied, one of the opposite directions corresponding to an expansion of the toggle joint and the other corresponding to a contraction of the toggle joint, a drive arm for the connecting arm pivotally mounted on the machine to drive the connecting arm in opposite directions along the aforesaid line, a main drive means in the machine for the drive arm, the main drive means including a drive shaft and an eccentric at one end of the drive shaft, and means for coupling the eccentric to one end of the drive arm whereby the drive arm is caused to oscillate about its pivot, said coupling means comprising a clutch engageable at a position of the eccentric corresponding to an expansion movement of the toggle joint and disengageable at a position of the eccentric corresponding to a contracting movement of the toggle joint, the clutch being automatically operable accordingly as the drive arm oscillates.

28. An embossing machine comprising a punch and die supporting member having a plurality of different sets of punches and dies arranged in spaced apart relation and selectively operable in pairs, a carriage member for holding an article to be embossed in embossing relation to the punch and die supporting member, one such member being movable in opposite directions relative to the other whereby embossures may be effected in a line on said article, means for selecting the punches and dies for actuation to effect successive embossures on the article, and means operable as an incident to selection of a punch and die set as aforesaid for effecting said relative movement over the shortest distance directly between the punch and die set last actuated and the punch and die set next to be actuated.

29. An embossing machine comprising a plurality of different punch and die sets, a supporting member for said punch and die sets, a carrying member for locating an article to be embossed adjacent the punch and die supporting member, means for selecting the punches and dies for successive actuation to effect successive embossing operations on the article, means for effecting relative movement between said members whereby the article may be presented in succession to selected punches and dies to receive successive embossures, the last-named means being operable by and upon actuation of said selecting means, and means for directing said relative movement over the shortest path directly between the last selected punch and die set and the punch and die set next to be selected.

30. An embossing machine comprising a supporting member, a plurality of punches and dies arranged in sets in said supporting member, a holder member for holding an article to be embossed in embossing relation to said supporting member, means for successively selecting the punches and dies for actuation to effect successive selected and spaced apart embossures in a line on the article, one of said members being mounted in the machine to be movable relative to the other in response to a punch and die selection operation whereby the punch and die set corresponding to said punch and die selection operation is disposed opposite an unembossed area on the article, and means operable automatically as an incident to selection of a punch and die set to effect said relative movement of said movable member directly over the shortest distance between any first selected punch and die set and any next selected punch and die set.

31. In an embossing machine in which an article to be embossed is to receive contiguous embossures in a line from and corresponding respectively to first and second selected punch and die sets, a plurality of different punch and die sets, a supporting member for said punch and die sets, a supporting member adapted to dispose the article adjacent the punch and die supporting member, means to select a punch and die set for actuation to effect a corresponding embossure on the article, means to move one of said supporting members in opposite directions relative to the other whereby a second punch and die set may be disposed in relation to the article to effect an embossure thereon adjacent an embossure corresponding to a first punch and die set, means operable as an incident to selection of such a second punch and die set to refer the position of the second punch and die set to said first punch and die set and to thereupon direct said relative movement occurring between said supporting members over the path corresponding to the shortest distance between the first and second punch and die sets, means to actuate the particular selected punch and die set after termination of said relative movement, and means to character space the article after a punch and die set effects an embossure on the article.

32. In an embossing machine in which an article to be embossed is to receive contiguous embossures in a line from and corresponding respectively to selected first and second punch and die sets, a plurality of different punch and die sets, a supporting member for said punch and die sets, a supporting member to dispose the article adjacent the punch and die supporting member, means including keys to enable a particular punch and die set to be selected for actuation to effect a corresponding embossure on the article, means operable upon actuation of a key to move one of said supporting members relative to the other whereby a second punch and die set is disposed in relation to the article to effect an embossure thereon adjacent an embossure corresponding to a first punch and die set, and means to direct said relative movement between said supporting members over the path corresponding to the shortest distance between the first and second punch and die sets.

33. In an embossing machine in which an article to be embossed is to receive contiguous embossures in a line from and corresponding respectively to selected first and second punch and die sets, a plurality of punch and die sets, a supporting member for said punch and die sets, a supporting member to dispose the article adjacent the punch and die supporting member, means to select a particular punch and die set for actuation to effect a corresponding embossure on the article, one of said supporting members being arranged for movement in opposite directions relative to the other whereby such a second punch and die set may be disposed in relation to the article to effect an embossure thereon adjacent an embossure corresponding to the first punch and die set, and means operable as an incident to selection of a second punch and die set to refer the position of the second punch and die set to the punch and die set first selected and to thereupon direct said relative movement over the path corresponding to the shortest distance between the first and second punch and die sets.

34. In an embossing machine in which an article to be embossed is to receive contiguous embossures in a line from and corresponding respectively to selected first and second punch and die sets, a supporting member for said punch and die sets, a supporting member to dispose the article adjacent the punch and die supporting member, selectively operable means to enable a particular punch and die set to be actuated to effect a corresponding embossure on the article, means operable automatically in respect to operation of said selectively operable means for moving one of said supporting members relative to the other whereby a second punch and die set may be disposed in relation to the article to effect an embossure thereon adjacent an embossure corresponding to a first punch and die set, and means to direct said relative movement over the path corresponding to the shortest distance between the first and second punch and die sets.

References Cited in the file of this patent

UNITED STATES PATENTS

| | | |
|---|---|---|
| 100,607 | Curtis | Mar. 8, 1870 |
| 444,757 | Leslie | Jan. 13, 1891 |
| 520,827 | Koss | June 5, 1894 |
| 624,764 | Duncan | May 9, 1899 |
| 725,139 | Reynolds et al. | Apr. 14, 1903 |
| 1,557,754 | Chisholm | Oct. 20, 1925 |
| 1,560,209 | Chisholm | Nov. 3, 1925 |
| 1,831,103 | Duncan et al. | Nov. 10, 1931 |
| 2,490,035 | Deakin | Dec. 6, 1949 |